(12) United States Patent
Anaya-Dufresne et al.

(10) Patent No.: US 9,449,629 B2
(45) Date of Patent: Sep. 20, 2016

(54) RESISTIVE TEMPERATURE SENSORS FOR IMPROVED ASPERITY, HEAD-MEDIA SPACING, AND/OR HEAD-MEDIA CONTACT DETECTION

(71) Applicant: Seagate Technology LLC, Cupertino, CA (US)

(72) Inventors: Manuel Charles Anaya-Dufresne, Edina, MN (US); Brian William Karr, Savage, MN (US); Gary Joseph Kunkel, Minneapolis, MN (US); Zhen Wei, Maple Grove, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/827,603

(22) Filed: Aug. 17, 2015

(65) Prior Publication Data
US 2016/0019923 A1    Jan. 21, 2016

Related U.S. Application Data

(62) Division of application No. 13/298,712, filed on Nov. 17, 2011, now Pat. No. 9,123,381.

(60) Provisional application No. 61/414,733, filed on Nov. 17, 2010, provisional application No. 61/414,734, filed on Nov. 17, 2010.

(51) Int. Cl.
*G11B 21/02* (2006.01)
*G11B 5/60* (2006.01)
(Continued)

(52) U.S. Cl.
CPC ............... *G11B 5/607* (2013.01); *G01K 13/00* (2013.01); *G11B 5/024* (2013.01); *G11B 5/6011* (2013.01); *G11B 5/6076* (2013.01); *G11B 20/10* (2013.01)

(58) Field of Classification Search
CPC . G11B 2220/20; G11B 27/36; G11B 5/3903; G11B 5/40; G11B 5/6005; G11B 5/59633; G11B 5/54; G11B 5/02; G11B 5/012; G11B 5/024

USPC ............... 360/66, 75, 55, 319, 78.05, 59, 76
See application file for complete search history.

(56) References Cited

U.S. PATENT DOCUMENTS

| | | |
|---|---|---|
| 5,025,341 A | 6/1991 | Bousquet et al. |
| 5,080,495 A | 1/1992 | Hashimoto et al. |

(Continued)

FOREIGN PATENT DOCUMENTS

| | | |
|---|---|---|
| EP | 0752700 | 1/1997 |
| EP | 1850333 | 10/2007 |

(Continued)

OTHER PUBLICATIONS

Korean Office Action with translation dated Jan. 20, 2014 for KR Application No. 10-2012-0130952, 11 pages.

(Continued)

*Primary Examiner* — Nabil Hindi
(74) *Attorney, Agent, or Firm* — Hollingsworth Davis, LLC

(57) ABSTRACT

A sensor supported by a head transducer has a temperature coefficient of resistance (TCR) and a sensor resistance. The sensor operates at a temperature above ambient and is responsive to changes in sensor-medium spacing. Conductive contacts connected to the sensor have a contact resistance and a cross-sectional area adjacent to the sensor larger than that of the sensor, such that the contact resistance is small relative to the sensor resistance and negligibly contributes to a signal generated by the sensor. A multiplicity of head transducers each support a TCR sensor and a power source can supply bias power to each sensor of each head to maintain each sensor at a fixed temperature above an ambient temperature in the presence of heat transfer changes impacting the sensors. A TCR sensor of a head transducer can include a track-oriented TCR sensor wire for sensing one or both of asperities of the medium.

21 Claims, 22 Drawing Sheets

(51) Int. Cl.
  *G11B 20/10* (2006.01)
  *G01K 13/00* (2006.01)
  *G11B 5/024* (2006.01)

(56) References Cited

U.S. PATENT DOCUMENTS

| | | | |
|---|---|---|---|
| 5,561,896 A | 10/1996 | Voegeli et al. | |
| 5,576,745 A | 11/1996 | Matsubara | |
| 5,646,805 A | 7/1997 | Shen et al. | |
| 5,689,292 A | 11/1997 | Suzuki et al. | |
| 5,691,867 A | 11/1997 | Onuma et al. | |
| 5,792,569 A | 8/1998 | Sun et al. | |
| 5,901,001 A | 5/1999 | Meyer | |
| 5,991,113 A | 11/1999 | Meyer et al. | |
| 6,019,503 A | 2/2000 | Abraham et al. | |
| 6,024,430 A | 2/2000 | Koitabashi et al. | |
| 6,052,243 A | 4/2000 | Shimada | |
| 6,052,249 A | 4/2000 | Abraham | |
| 6,071,007 A | 6/2000 | Schaenzer | |
| 6,101,056 A * | 8/2000 | Klaassen | B82Y 25/00 360/66 |
| 6,125,008 A | 9/2000 | Berg | |
| 6,178,157 B1 | 1/2001 | Berg | |
| 6,181,520 B1 | 1/2001 | Fukuda | |
| 6,262,572 B1 | 7/2001 | Franco et al. | |
| 6,262,858 B1 | 7/2001 | Sugiyama et al. | |
| 6,265,869 B1 | 7/2001 | Takahashi | |
| 6,311,551 B1 | 11/2001 | Boutaghou et al. | |
| 6,333,836 B1 | 12/2001 | Boutaghou et al. | |
| 6,338,899 B1 | 1/2002 | Fukuzawa et al. | |
| 6,359,746 B1 | 3/2002 | Kakekado | |
| 6,366,416 B1 | 4/2002 | Meyer | |
| 6,377,422 B1 | 4/2002 | Boutaghou et al. | |
| 6,501,606 B2 | 12/2002 | Boutaghou | |
| 6,512,648 B1 * | 1/2003 | Tsuchiya | G11B 5/00813 360/66 |
| 6,552,880 B1 | 4/2003 | Dunbar | |
| 6,577,466 B2 | 6/2003 | Meyer | |
| 6,594,104 B2 | 7/2003 | Tokuyama et al. | |
| 6,600,622 B1 | 7/2003 | Smith | |
| 6,603,619 B1 | 8/2003 | Kojima et al. | |
| 6,662,623 B2 | 12/2003 | Baumgartner | |
| 6,666,076 B2 | 12/2003 | Lin | |
| 6,671,133 B1 | 12/2003 | Sasaki et al. | |
| 6,692,848 B2 | 2/2004 | Ohtani | |
| 6,697,223 B2 | 2/2004 | Lewis | |
| 6,700,724 B2 | 3/2004 | Riddering | |
| 6,771,453 B2 | 8/2004 | Baumgartner | |
| 6,776,176 B1 | 8/2004 | Kino | |
| 6,785,081 B2 | 8/2004 | Chapin | |
| 6,788,500 B2 | 9/2004 | Baril et al. | |
| 6,899,456 B2 | 5/2005 | Sundaram et al. | |
| 6,958,871 B2 | 10/2005 | Hirano | |
| 6,967,805 B1 | 11/2005 | Hanchi et al. | |
| 7,006,336 B2 | 2/2006 | Coffey et al. | |
| 7,042,674 B1 | 5/2006 | Baril et al. | |
| 7,064,659 B2 | 6/2006 | Baumgartner | |
| 7,068,457 B2 | 6/2006 | Riddering | |
| 7,092,195 B1 | 8/2006 | Liu et al. | |
| 7,097,110 B2 | 8/2006 | Sheperek | |
| 7,099,096 B2 | 8/2006 | Ueyanagi | |
| 7,130,141 B2 | 10/2006 | Chey et al. | |
| 7,180,692 B1 | 2/2007 | Che | |
| 7,190,543 B2 | 3/2007 | Suk | |
| 7,194,802 B2 | 3/2007 | Fayeulle | |
| 7,199,960 B1 | 4/2007 | Schreck | |
| 7,233,451 B2 | 6/2007 | Baumgart | |
| 7,262,936 B2 | 8/2007 | Hamann et al. | |
| 7,265,922 B2 | 9/2007 | Biskeborn et al. | |
| 7,278,902 B1 | 10/2007 | Kurita | |
| 7,310,197 B2 | 12/2007 | Baumgart | |
| 7,310,198 B2 | 12/2007 | Baumgart | |
| 7,312,941 B2 | 12/2007 | Hirano | |
| 7,362,535 B2 | 4/2008 | Kumano | |
| 7,365,931 B2 | 4/2008 | Ikai | |
| 7,371,708 B2 | 5/2008 | Arai et al. | |
| 7,372,665 B1 | 5/2008 | Stoev et al. | |
| 7,411,752 B2 | 8/2008 | Angelo | |
| 7,417,820 B2 | 8/2008 | Otsuki et al. | |
| 7,450,333 B2 | 11/2008 | Hirano | |
| 7,477,470 B2 | 1/2009 | Leis et al. | |
| 7,502,205 B1 | 3/2009 | Hurtado et al. | |
| 7,508,612 B2 | 3/2009 | Biskeborn et al. | |
| 7,518,818 B2 | 4/2009 | Yamazaki et al. | |
| 7,561,368 B2 | 7/2009 | Kim et al. | |
| 7,564,649 B2 | 7/2009 | Hanchi et al. | |
| 7,593,187 B2 | 9/2009 | Aoki | |
| 7,595,960 B2 | 9/2009 | Shimizu et al. | |
| 7,616,398 B2 | 11/2009 | Gong | |
| 7,623,322 B2 | 11/2009 | Umehara et al. | |
| 7,626,144 B2 | 12/2009 | Merzliakov | |
| 7,649,714 B2 | 1/2010 | Kato et al. | |
| 7,692,888 B2 | 4/2010 | Duan | |
| 7,692,898 B2 | 4/2010 | Hattori | |
| 7,706,109 B2 | 4/2010 | Nichols et al. | |
| 7,724,480 B1 | 5/2010 | Guo | |
| 7,729,079 B1 | 6/2010 | Huber | |
| 7,729,087 B1 | 6/2010 | Stoev et al. | |
| 7,742,255 B2 | 6/2010 | Daugela | |
| 7,760,457 B1 | 7/2010 | Gunderson | |
| 7,773,346 B1 | 8/2010 | Guo | |
| 7,787,201 B2 | 8/2010 | Alex | |
| 7,787,207 B2 | 8/2010 | Takahashi | |
| 7,796,356 B1 | 9/2010 | Fowler et al. | |
| 7,800,858 B1 | 9/2010 | Bajikar et al. | |
| 7,804,657 B1 | 9/2010 | Hogg et al. | |
| 7,864,474 B2 | 1/2011 | Satoh et al. | |
| 7,872,824 B1 | 1/2011 | Macchioni et al. | |
| 7,903,365 B2 | 3/2011 | Watanabe | |
| 7,929,249 B2 | 4/2011 | Seigler | |
| 7,929,256 B2 | 4/2011 | Yamashita et al. | |
| 8,049,984 B2 | 11/2011 | Contreras | |
| 8,098,450 B2 | 1/2012 | Baumgart et al. | |
| 8,144,412 B2 | 3/2012 | Kiyono | |
| 8,149,541 B2 | 4/2012 | Baumgart | |
| 8,199,431 B2 | 6/2012 | Kanaya et al. | |
| 8,248,737 B2 | 8/2012 | Chen | |
| 8,279,557 B2 | 10/2012 | Kautzky | |
| 8,297,113 B2 | 10/2012 | Liners et al. | |
| 8,310,779 B2 | 11/2012 | Hanchi | |
| 8,335,053 B2 | 12/2012 | Chen | |
| 8,523,312 B2 | 9/2013 | Zheng et al. | |
| 8,737,009 B2 | 5/2014 | Kunkel et al. | |
| 8,804,263 B1 | 8/2014 | Contreras et al. | |
| 2002/0039264 A1 | 4/2002 | Ohsawa et al. | |
| 2002/0056313 A1 | 5/2002 | Wakefield | |
| 2002/0071196 A1 | 6/2002 | Chapin | |
| 2002/0071215 A1 | 6/2002 | Lewis | |
| 2002/0093753 A1 | 7/2002 | Atsumi | |
| 2002/0118485 A1 | 8/2002 | Tokuyama et al. | |
| 2003/0002183 A1 | 1/2003 | Fioravanti | |
| 2003/0043491 A1 | 3/2003 | Riddering | |
| 2003/0043497 A1 | 3/2003 | Riddering | |
| 2003/0051529 A1 | 3/2003 | Baumgartner | |
| 2003/0058559 A1 | 3/2003 | Brand | |
| 2003/0086197 A1 | 5/2003 | Baumgartner | |
| 2003/0206361 A1 | 11/2003 | Baril et al. | |
| 2004/0027728 A1 | 2/2004 | Coffey et al. | |
| 2004/0085670 A1 | 5/2004 | Li et al. | |
| 2004/0190175 A1 | 9/2004 | Chey et al. | |
| 2004/0240109 A1 | 12/2004 | Hamann et al. | |
| 2005/0057833 A1 | 3/2005 | Hirano | |
| 2005/0057834 A1 | 3/2005 | Hirano | |
| 2005/0174665 A1 | 8/2005 | Zhang | |
| 2005/0176582 A1 | 8/2005 | Arai et al. | |
| 2005/0190496 A1 | 9/2005 | Hamann et al. | |
| 2006/0034013 A1 | 2/2006 | Kato et al. | |
| 2006/0119974 A1 | 6/2006 | Yamazaki et al. | |
| 2006/0285243 A1 | 12/2006 | Baumgart | |
| 2007/0019325 A1 | 1/2007 | Shimizu et al. | |
| 2007/0091512 A1 | 4/2007 | Nichols et al. | |
| 2007/0097536 A1 | 5/2007 | Biskeborn et al. | |
| 2007/0133118 A1 | 6/2007 | Kajitani | |
| 2007/0201154 A1 | 8/2007 | Ozeki | |

(56) References Cited

U.S. PATENT DOCUMENTS

| | | |
|---|---|---|
| 2007/0206654 A1 | 9/2007 | Merzliakov |
| 2007/0242382 A1 | 10/2007 | Biskeborn et al. |
| 2008/0080086 A1 | 4/2008 | Che |
| 2008/0100965 A1 | 5/2008 | Oki |
| 2008/0130152 A1 | 6/2008 | Kameyama |
| 2008/0137225 A1 | 6/2008 | Duan |
| 2008/0145709 A1 | 6/2008 | Yamashita et al. |
| 2008/0218909 A1 | 9/2008 | Kurihara |
| 2008/0225426 A1 | 9/2008 | Roy et al. |
| 2008/0225427 A1 | 9/2008 | Liu |
| 2008/0239581 A1 | 10/2008 | Ikai et al. |
| 2008/0247078 A1 | 10/2008 | Yao |
| 2008/0247079 A1 | 10/2008 | Satoh et al. |
| 2008/0247080 A1 | 10/2008 | Kim et al. |
| 2008/0259480 A1 | 10/2008 | Pham |
| 2008/0291579 A1 | 11/2008 | Uesugi et al. |
| 2009/0021867 A1 | 1/2009 | Kondo |
| 2009/0122435 A1 | 5/2009 | Takahashi |
| 2009/0153995 A1 | 6/2009 | Jang |
| 2009/0190260 A1 | 7/2009 | Kobatake |
| 2009/0262460 A1 | 10/2009 | Hanchi |
| 2010/0007976 A1 | 1/2010 | Baumgart |
| 2010/0020439 A1 | 1/2010 | Watanabe |
| 2010/0053815 A1 | 3/2010 | Komoriya |
| 2010/0097721 A1 | 4/2010 | Baumgart |
| 2010/0142096 A1 | 6/2010 | Contreras |
| 2010/0149696 A1 | 6/2010 | Chen |
| 2010/0157477 A1 | 6/2010 | Morinaga |
| 2010/0182723 A1 | 7/2010 | Yanagisawa |
| 2010/0232067 A1 | 9/2010 | Liners et al. |
| 2010/0284102 A1 | 11/2010 | Gubbins et al. |
| 2011/0032642 A1 | 2/2011 | Kautzky |
| 2011/0096440 A1 | 4/2011 | Greminger |
| 2011/0122533 A1 | 5/2011 | Kiyono |
| 2011/0157740 A1 | 6/2011 | Baumgart et al. |
| 2011/0235207 A1 | 9/2011 | Yang |
| 2011/0235208 A1 | 9/2011 | Yang |
| 2011/0249363 A1 | 10/2011 | Kanaya et al. |
| 2012/0099218 A1 | 4/2012 | Kurita |
| 2012/0105999 A1 | 5/2012 | Chen |
| 2012/0113207 A1 | 5/2012 | Zheng |
| 2012/0120519 A1 | 5/2012 | Kunkel et al. |
| 2012/0120521 A1 | 5/2012 | Kurita |
| 2012/0120522 A1 | 5/2012 | Johnson et al. |
| 2012/0120527 A1 | 5/2012 | Kunkel et al. |
| 2012/0120528 A1 | 5/2012 | Furukawa |
| 2012/0120982 A1 | 5/2012 | Anaya-Dufresne et al. |
| 2012/0201108 A1 | 8/2012 | Zheng et al. |
| 2013/0250446 A1 | 9/2013 | Zeng et al. |
| 2013/0250455 A1 | 9/2013 | Zeng et al. |
| 2013/0286802 A1 | 10/2013 | Kiely |
| 2013/0286805 A1 | 10/2013 | Macken et al. |
| 2014/0009851 A1 | 1/2014 | Budde |
| 2014/0023108 A1 | 1/2014 | Johnson et al. |
| 2014/0029402 A1 | 1/2014 | Zheng et al. |
| 2014/0269819 A1 | 9/2014 | Kiely et al. |
| 2014/0269838 A1 | 9/2014 | Macken |
| 2015/0062754 A1 | 3/2015 | Peng et al. |

FOREIGN PATENT DOCUMENTS

| | | |
|---|---|---|
| JP | 06168421 | 6/1994 |
| JP | 07114717 | 5/1995 |
| JP | 10049927 | 2/1998 |
| JP | 11339414 | 12/1999 |
| JP | 2003297029 | 10/2003 |
| JP | 2004335069 | 11/2004 |
| JP | 2007234093 | 9/2007 |
| JP | 2008097760 | 4/2008 |
| JP | 2008112545 | 5/2008 |
| JP | 2008186549 | 8/2008 |
| JP | 2009129532 | 6/2009 |
| KR | 1020110108181 | 10/2011 |
| WO | WO2012068399 | 5/2012 |

OTHER PUBLICATIONS

Office Action dated Nov. 4, 2014 for JP Application No. 2013-540023, 2 pages.
Office Action dated Nov. 25, 2014 for JP Application No. 2013-136342, 4 pages.
European Search Report dated Mar. 4, 2013 for EP Application No. 12192502.8, 6 pages.
File History for U.S. Appl. No. 13/299,082.
File History for U.S. Appl. No. 13/299,094.
File History for U.S. Appl. No. 13/299,139.
File History for U.S. Appl. No. 12/941,461.
File History for U.S. Appl. No. 14/016,645.
File History for U.S. Appl. No. 14/287,419.
File History for U.S. Appl. No. 14/287,412.
File History for U.S. Appl. No. 14/457,678.
File History for U.S. Appl. No. 14/457,694.
File History for U.S. Appl. No. 13/298,712.
International Search Report and Written Opinion dated Feb. 28, 2012 for PCT Application No. PCT/US2011/061233, 12 pages.
International Search Report and Written Opinion dated Feb. 28, 2012 for PCT Application No. PCT/US2011/061236, 11 pages.
International Preliminary Report on Patentability dated May 30, 2013 for PCT Application No. PCT/US2011/061233, 8 pages.
International Preliminary Report on Patentability dated May 30, 2013 for PCT Application No. PCT/US2011/061236, 7 pages.
Kirchhoff's Voltage Law (KVL): Divider Circuits and Kirchhoff's Laws, http://www/alaboutcircuits.com/vol 1/chot 6/2.html, retrieved from the internet on Jul. 14, 2014, 12 pages.
Schreck et al., "Thin Film Thermocouple Sensors for Measurement of Contact Temperatures During Slider Asperity Interaction on Magnetic Recording Disks", IEEE Transactions on Magnetics, vol. 28, No. 5, Sep. 1992, pp. 2548-2550.
Office action dated Jun. 19, 2015 for U.S. Appl. No. 14/720,299, 18 pages.

\* cited by examiner

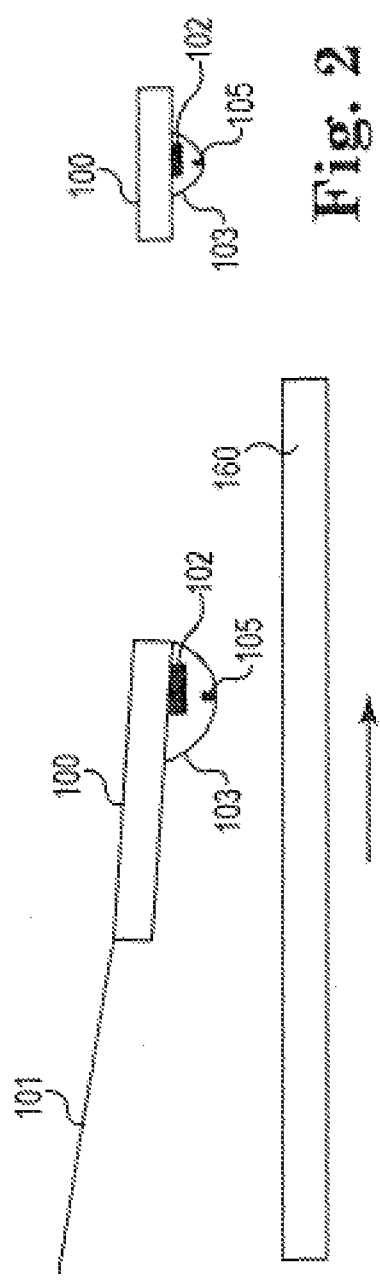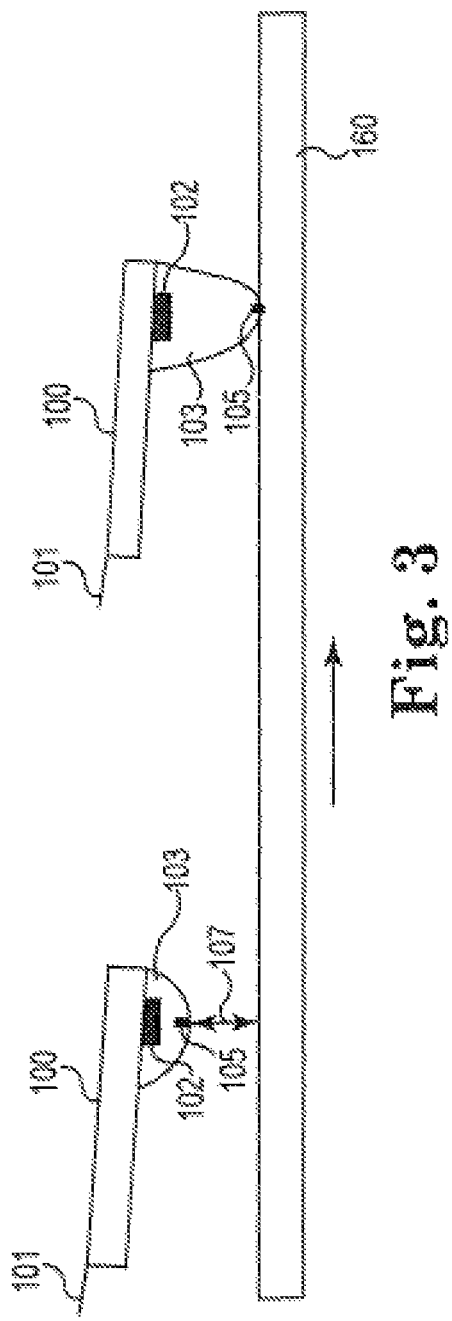

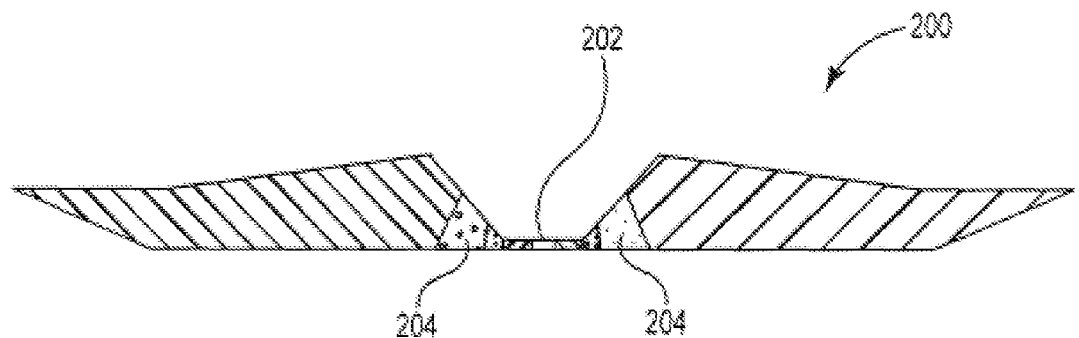
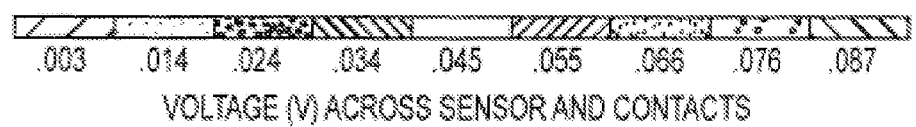
Fig. 6A
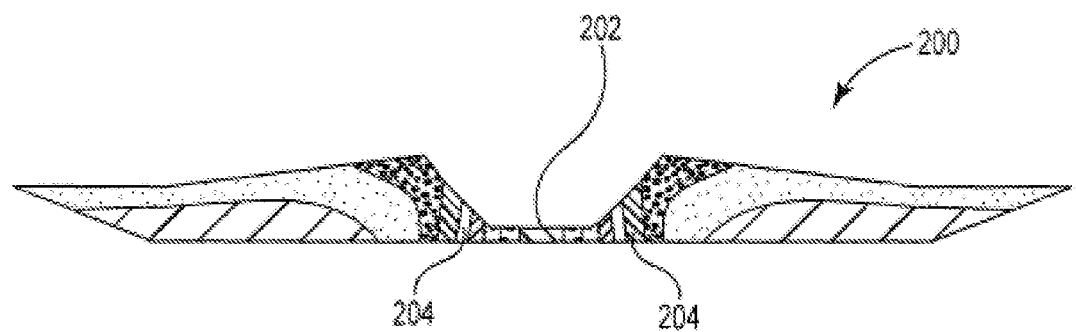
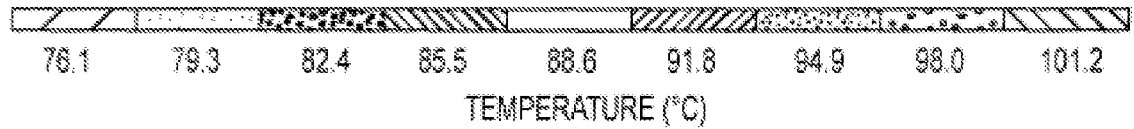
Fig. 6B

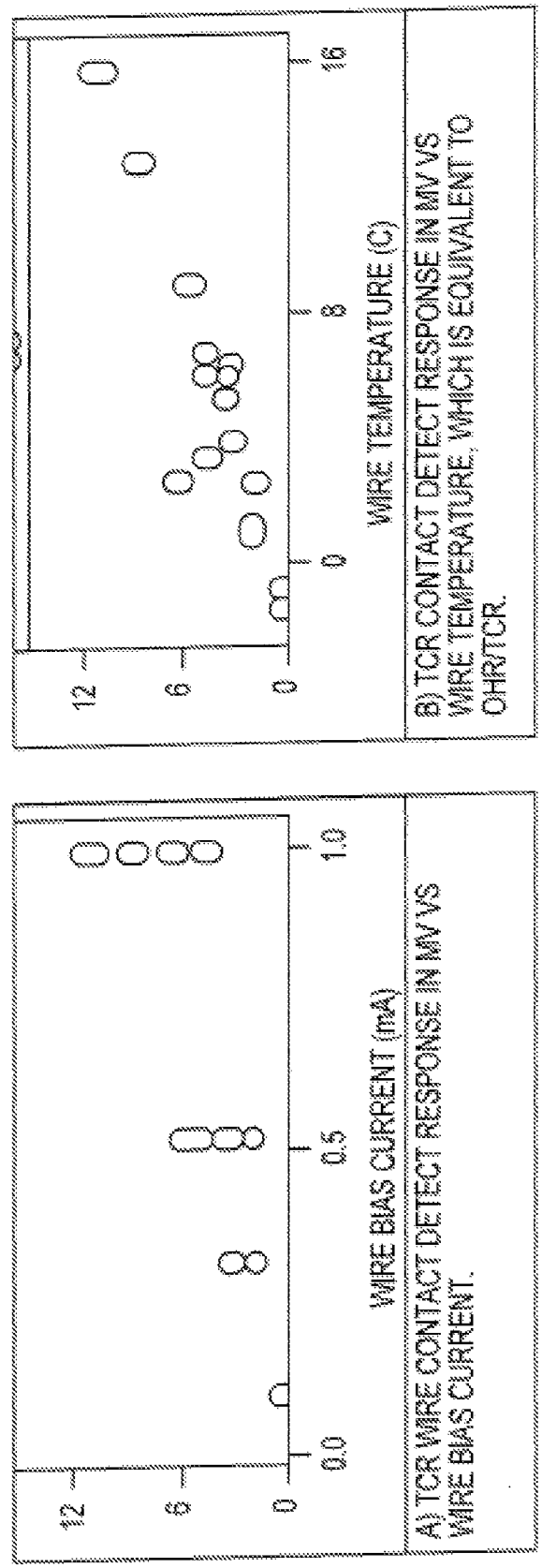

TCR Wire Temperature vs. Different Variables
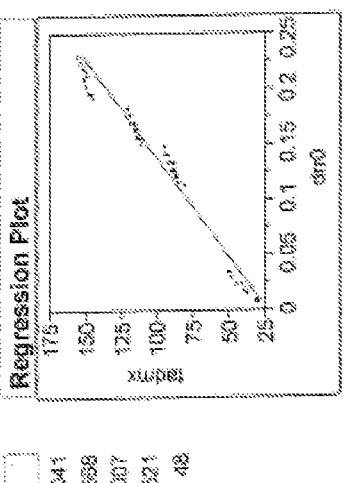
Fig. 17A
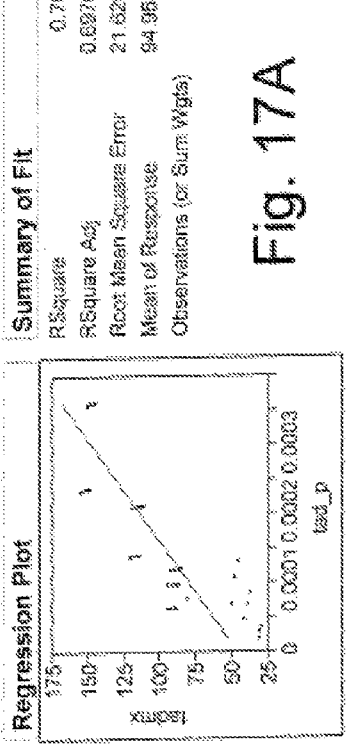
Fig. 17C
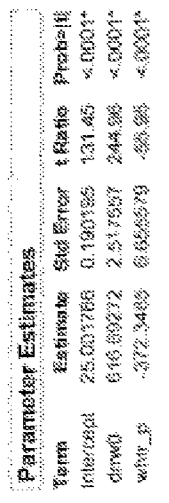
Fig. 17B
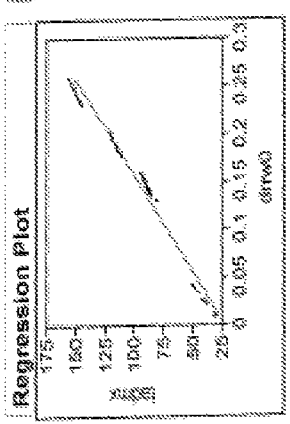
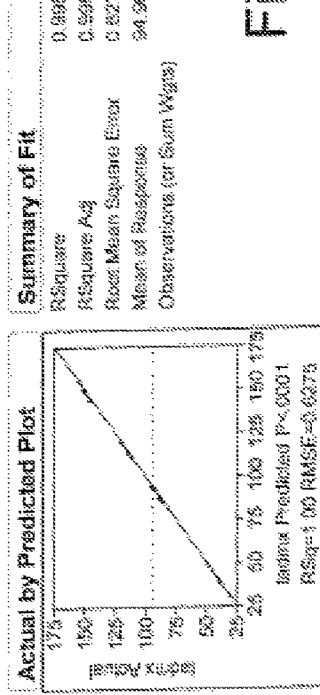
Fig. 17D T(Wire, Voltage, Heater Power) vs. T(OHR, Heater Power)

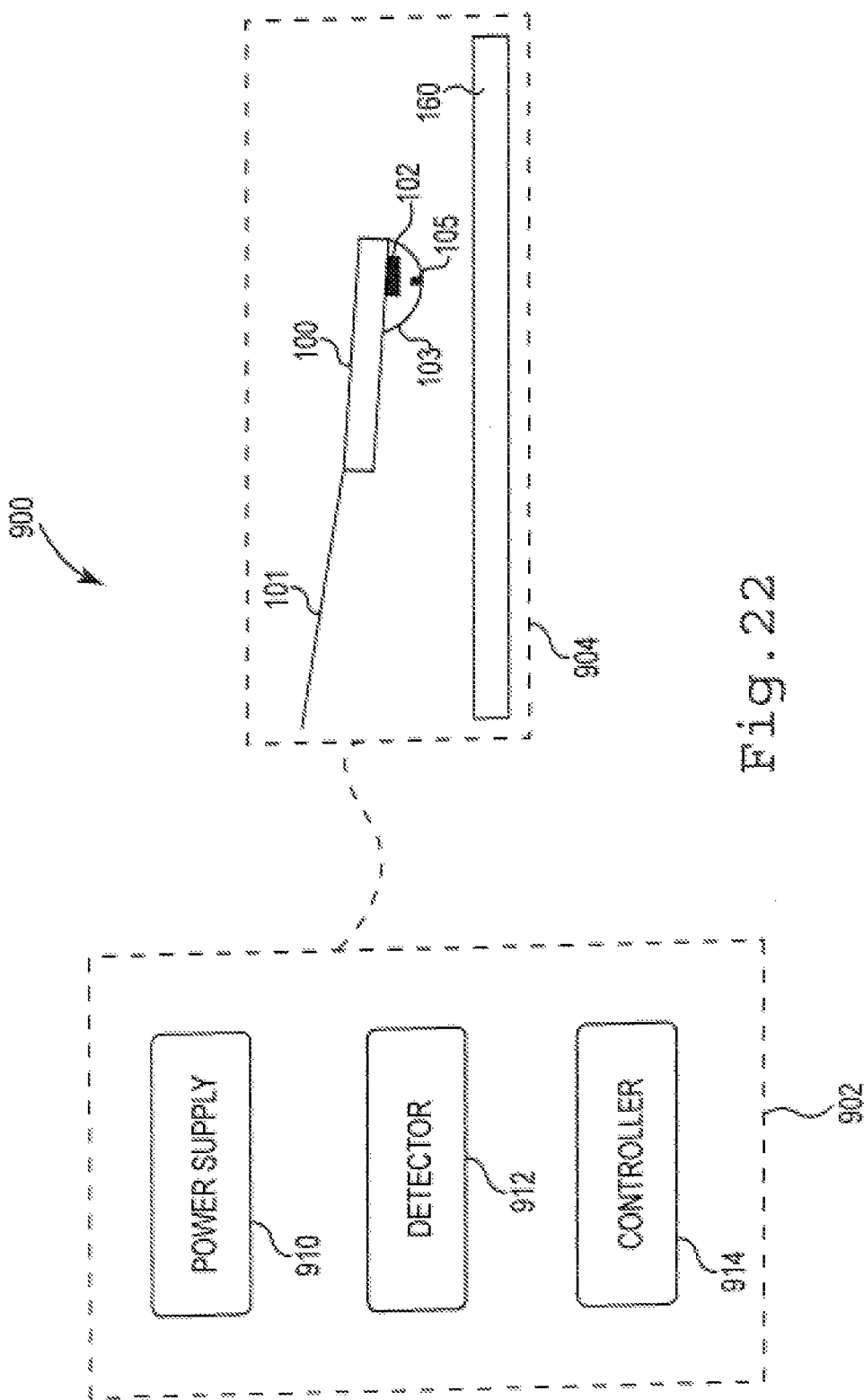

US 9,449,629 B2

RESISTIVE TEMPERATURE SENSORS FOR IMPROVED ASPERITY, HEAD-MEDIA SPACING, AND/OR HEAD-MEDIA CONTACT DETECTION

RELATED PATENT DOCUMENTS

This application is a divisional of U.S. patent application Ser. No. 13/298,712, filed Nov. 17, 2011 and claims the benefit of Provisional Patent Application Ser. Nos. 61/414,733 and 61/414,734 both filed on Nov. 17, 2010, to which priority is claimed pursuant to 35 U.S.C. §119(e) and which are hereby incorporated herein by reference in their respective entirety.

SUMMARY

Embodiments of the disclosure are directed to an apparatus that includes a head transducer configured to interact with a magnetic recording medium. A sensor is provided at the head transducer and has a temperature coefficient of resistance and a sensor resistance. The sensor is configured to operate at a temperature above an ambient temperature and is responsive to changes in spacing between the sensor and the medium. Electrically conductive contacts are connected to the sensor and have a contact resistance. The contacts have a cross-sectional area adjacent to the sensor larger than that of the sensor such that the contact resistance is small relative to the sensor resistance and negligibly contributes to a signal generated by the sensor.

Embodiments are directed to a method involving sensing, with a magnetic recording medium moving relative to a head transducer, temperature at a close point of the head transducer using a sensor having a temperature coefficient of resistance. The sensor is connected to electrically conductive contacts having a contact resistance. The contacts have a cross-sectional area adjacent to the sensor larger than that of the sensor such that the contact resistance is small relative to a resistance of the sensor and negligibly contributes to a signal generated by the sensor. The method further involves outputting the sensor signal and detecting asperities of the medium using the sensor signal.

According to various embodiments, an apparatus includes a multiplicity of head transducers configured to interact with magnetic recording media and a multiplicity of sensors having a temperature of coefficient of resistance. At least one sensor is provided on each head transducer and is responsive to changes in spacing between the sensor and the media. A power source is configured to supply bias power to each sensor of each head transducer and to adjust the bias power to maintain each sensor at a fixed temperature above an ambient temperature in the presence of heat transfer changes impacting the sensors.

In other embodiments, a method involves sensing, with magnetic recording media moving relative to a multiplicity of head transducers, for changes in spacing between the head transducers and the media using sensors having a temperature of coefficient of resistance. The method further involves supplying bias power to the sensors and adjusting the bias power to maintain each sensor at a fixed temperature above an ambient temperature in the presence of heat transfer changes impacting the sensors.

Embodiments are directed to an apparatus that includes a head transducer configured to interact with a magnetic recording medium having a multiplicity of tracks. The apparatus also includes a sensor having a temperature coefficient of resistance and arranged at the head transducer so that a longitudinal axis of the sensor is oriented substantially parallel relative to the tracks, the sensor responsive to one or both of asperities of the medium and changes in spacing between the sensor and the medium.

In further embodiments, a method involves sensing, with a magnetic recording medium moving relative to a head transducer, for one or both of asperities of the medium and changes in spacing between the head transducer and the medium using a sensor having a temperature of coefficient of resistance. The sensor has a longitudinal axis oriented substantially parallel relative to the tracks.

These and other features and aspects of various embodiments may be understood in view of the following detailed discussion and accompanying drawings.

BRIEF DESCRIPTION OF THE DRAWINGS

FIG. 1 is a simplified side view of a heater-actuated head transducer arrangement that incorporates a temperature sensor in accordance with various embodiments;

FIG. 2 is a front view of the heater-actuated head transducer arrangement shown in FIG. 1;

FIG. 3 shows the heater-actuated head transducer arrangement of FIGS. 1 and 2 in a pre-actuated configuration and an actuated configuration;

FIG. 6A shows a voltage profile across a resistance temperature sensor without low-resistance contacts;

FIG. 6B shows a temperature profile across a resistance temperature sensor without low-resistance contacts;

FIG. 12A shows a contact detection response of a multiplicity of resistance temperature sensor as a function of sensor bias current;

FIG. 12B shows a contact detection response of a multiplicity of resistance temperature sensor as a function of sensor overheat ratio (OHR)/temperature;

FIGS. 17A-17I show regressions of the maximum wire temperature predicted by a multi-heat source thermo-mechanical model (MXTM) vs. different input variables in accordance with various embodiments;

FIG. 22 shows an illustration of an apparatus for detecting asperities, head-media contact, and head-media spacing changes in accordance with various embodiments.

DETAILED DESCRIPTION

Figure 4A:
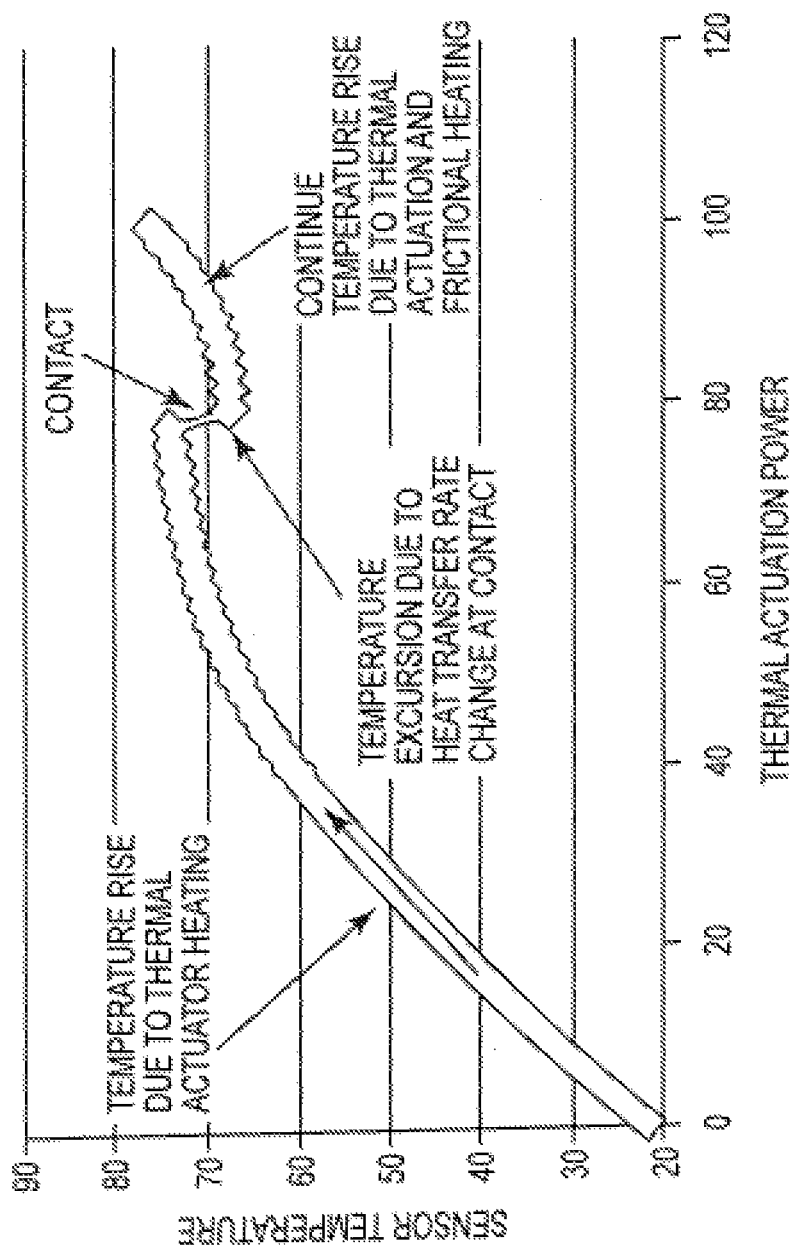
FIG. 4A illustrates a representative temperature profile for a heater-actuated recording head transducer of the type shown in FIGS. 1-3 before, during, and after contact between the head transducer and a surface of a magnetic recording disk.

Data storage systems commonly include one or more recording head transducers that read and write information to a magnetic recording medium. It is often desirable to have a relatively small distance or spacing between a recording head transducer and its associated medium. This distance or spacing is known as "fly height" or "head-media spacing." By reducing the head-media spacing, a recording head transducer is typically better able to both write and read data to and from a medium. Reducing the head-media spacing also allows for surveying of recording medium topography, such as for detecting asperities and other features of the recording medium surface.

In accordance with various embodiments, and with reference to FIGS. 1-3, a slider 100 is shown supported by a suspension 101 in close proximity to a rotating magnetic storage medium 160. The slider 100 supports a recording head transducer 103 and a heater 102 thermally coupled to the head transducer 103. The heater 102 may be a resistive heater that generates thermal heat as electrical current is passed through the heater 102. The heater 102 is not limited to resistive heaters, and may include any type of heating source. The thermal energy generated by the heater 102 causes thermal expansion of the head transducer 103. This thermal expansion can be used to reduce the head-media spacing 107 in a data storage system. It is noted that, in some embodiments, a non-thermal actuator can be used to reduce the head-media spacing 107.

A resistance temperature sensor 105 is shown situated on the head transducer 103 at or near the close point. The resistance temperature sensor 105 is preferably a sensor having a temperature coefficient of resistance (TCR), and is referred to herein as a TCR sensor 105. As discussed previously, actuation of the head transducer 103 can be realized by a thermal actuator, such as the heater 102, or other actuator (e.g., a writer). Bias power is applied to the TCR sensor 105 to raise the surface temperature of the sensor 105 and adjacent portion of the head transducer 103 to be substantially higher than the temperature of the magnetic recording medium 160.

The TCR sensor 105 is preferably configured to sense changes in heat flow for detecting onset of head-medium contact. Details concerning head-media spacing and contact determinations in accordance with various embodiments of the disclosure are provided in commonly owned U.S. patent application Ser. No. 12/941,461 filed Nov. 8, 2010 which is incorporated herein by reference.

As is depicted in FIG. 3, before head-media contact, there is an air gap 107 defined between the hot head surface and the relatively cool disk 160. The head transducer 103, air gap 107, and magnetic recording disk 160 define one level of heat transfer rate. When the head transducer 103 is in contact with the disk 160, such as after activation of the thermal actuator or heater 102, the direct contact between the high thermal conductivity materials of the head transducer 103 and the disk 160 significantly increases the heat transfer rate. As such, the TCR sensor 105 on the head transducer 103 senses a drop of temperature or an excursion of temperature trajectory, allowing for detection of head-media contact.

FIG. 4A illustrates a representative temperature profile for a recording head transducer 103 of the type shown in FIGS. 1-3 before, during, and after contact between the head transducer 103 and a surface of the magnetic recording disk 160. In this non-limiting illustrative example, the temperature profile is represented as a steady state DC signal for purposes of explanation. When the head transducer 103 is actuated by a thermal actuator 102, the head transducer surface temperature will increase with the actuation due to the heat generated by the thermal actuator 102. The head transducer temperature will be higher than the temperature of the disk 160. As such, the disk 160 acts as a heat sink in this scenario. When the head transducer 103 contacts the disk 160, the head transducer surface temperature will drop due to a change in heat transfer rate resulting from the contact. The head transducer surface temperature will continue to increase due to thermal actuator heating and frictional heating. The change in temperature or excursion in temperature trajectory can be used to declare head-media contact.

Figure 4B:
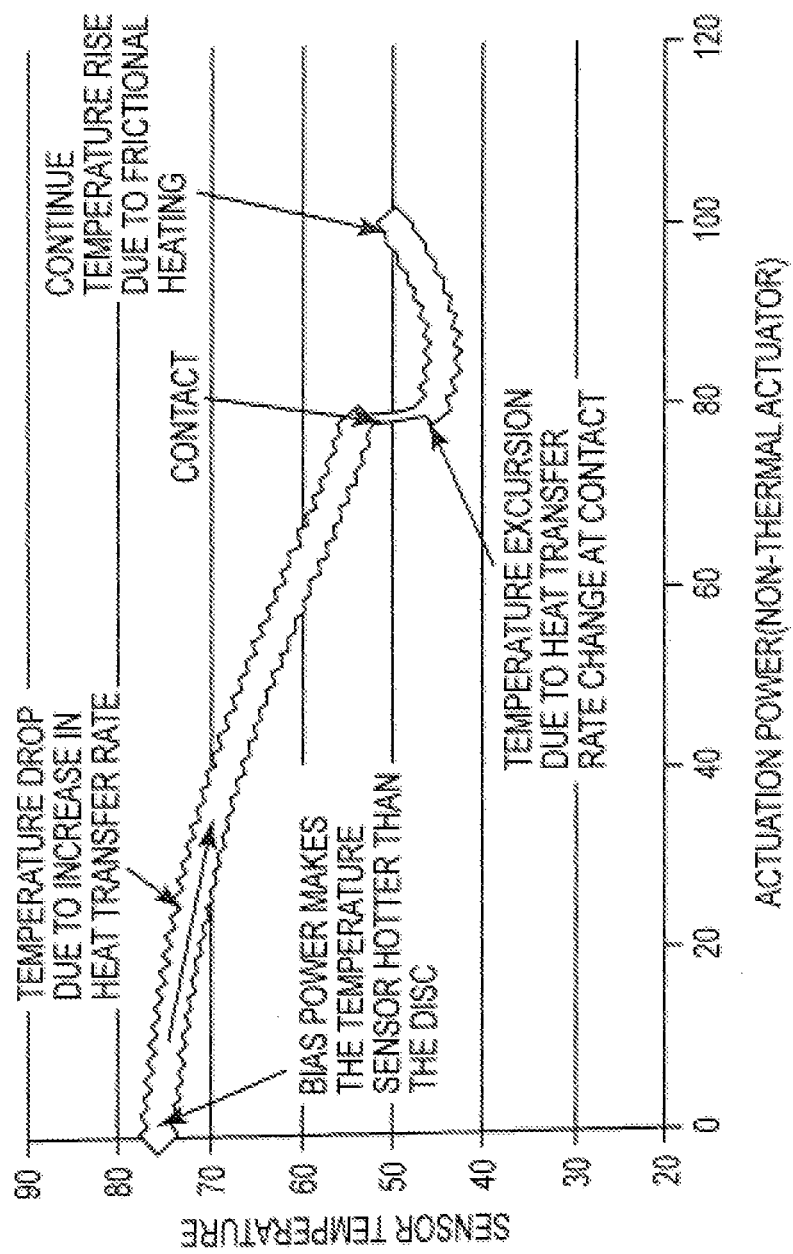
FIG. 4B illustrates a representative temperature profile for a non-thermal actuatable recording head transducer before, during, and after contact between the head transducer and a surface of a magnetic recording disk.

FIG. 4B illustrates a representative temperature profile for a recording head transducer 103 which is actuated by a non-thermal actuator. In this illustrative example, the TCR sensor bias power self-heats the TCR sensor 105 to cause an increase in a temperature at the head-to-disk interface to be substantially higher than the temperature of the disk 160. The disk 160 acts as a heat sink in this scenario. When the head transducer 103 is actuated down toward the disk 160, the heat transfer rate increases gradually, causing a gradual decrease in the temperature of the sensor 105. When the head transducer 103 comes into contact with the disk 160, there will be a change in heat transfer rate, causing a head transducer surface temperature excursion. The TCR sensor 105 on the head transducer surface measures this temperature excursion to detect head-media contact. Should further actuation into head-media contact occur, the temperature will eventually increase due to frictional heating.

In the following discussion, reference is made to a temperature coefficient of resistance wire which represents an embodiment of a suitable resistance temperature sensor in accordance with various embodiments. It is understood that the term "wire" is used herein for purposes of explanation, and does not limit a resistance temperature sensor or sensor element to a wire structure. Other TCR structures and sensor configurations are contemplated.

Figure 5:
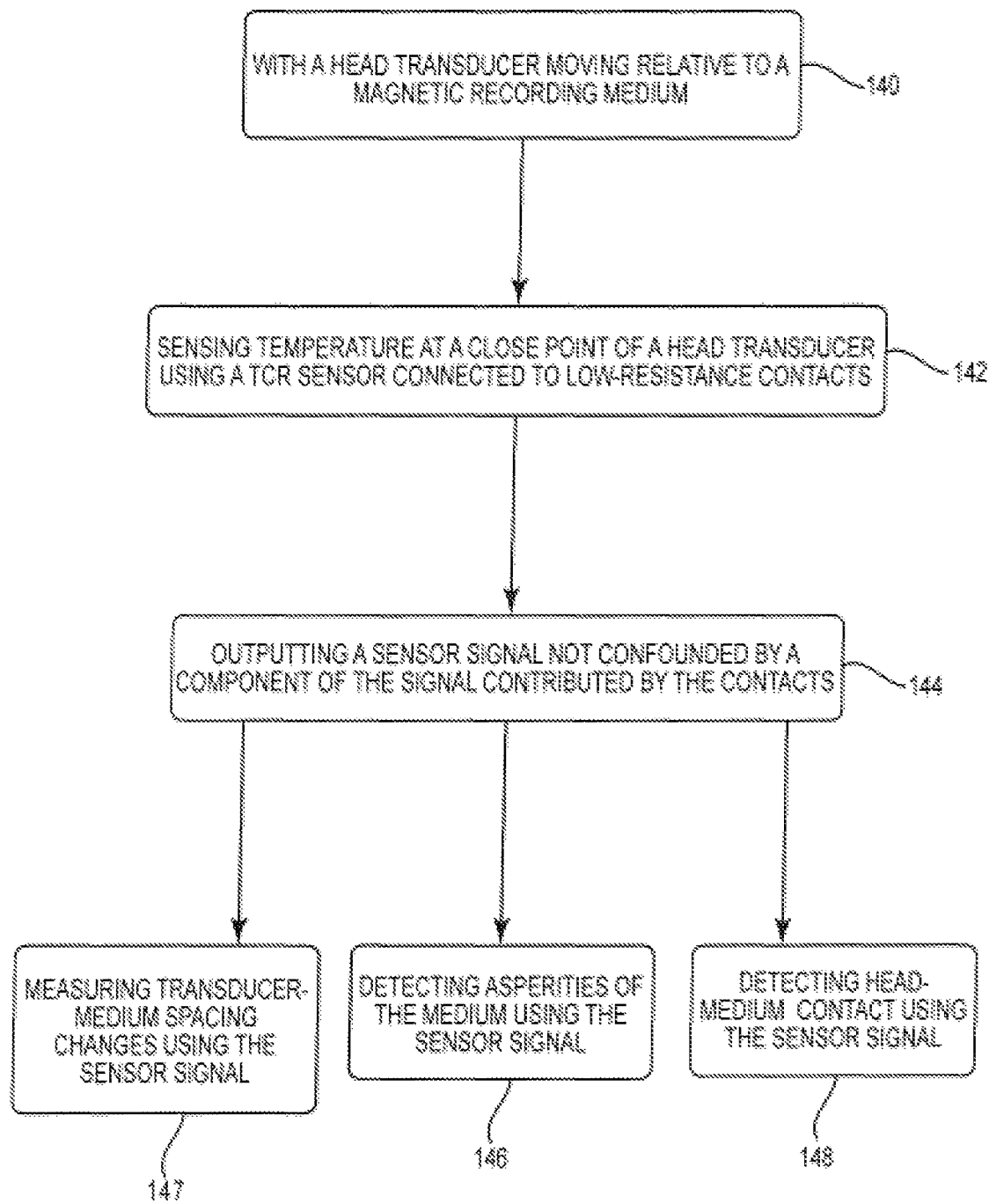
FIG. 5 is a flow chart showing various processes for detecting asperities of a magnetic recording medium using a resistance temperature sensor with low-resistance contacts in accordance with various embodiments.

Turning now to FIG. 5, there is illustrated various processes of sensing head-medium spacing changes and contact events in accordance with various embodiments. With the head transducer moving 140 relative to a magnetic recording media, the method illustrated in FIG. 5A involves sensing 142 temperature at a close point of the head transducer using a resistance temperature sensor connected to low-resistance contacts. The method also involves outputting 144 a sensor signal which is not confounded by a component of the signal contributed by the contacts. Various processes may be performed using the sensor signal, including detecting 146 asperities of the medium, measuring 147 head-medium spacing changes, and detecting 148 head-medium contact.

When a TCR wire of a resistive temperature sensor is run hot (e.g., above ambient temperature and, in particular, above the temperature of the associated magnetic recording medium), a portion of the heat generated by the wire is lost to the adjacent electrically conductive contacts. Conventional implementations typically have a relatively high resistance in the contacts adjacent to the hot sensor. As a result, the contacts next to the TCR wire also end up contributing to the measured signal and makes the "effective sensor" larger than the geometry of the designed TCR wire sensor.

There are several problems with this including, but not limited to, the following. The effective size of the TCR sensor is larger than desired. In the case of asperity detection, the size of asperities smaller than the effective length of the TCR sensor cannot be accurately characterized. A true TCR wire/sensor-only overheat ratio, OHR, cannot be set because the resistance of the contacts also contributes to the measured resistance change. This will vary with design, unless the resistances of the contacts or the temperature the contacts are exposed to are negligible. Lastly, there will be a significantly different frequency response of the large contacts compared to the small TCR wire. If the contacts are also contributing to the measured signal, they will contaminate the measured response of the TCR wire itself.

In general, it is desirable to run the TCR wire sensors hot, meaning that a sufficient electrical bias is put on the TCR wire to heat it up above its ambient surrounding. The sensor signal then comes from measuring the change in temperature due to heat transfer changes at the resistance element sensor. Since the material has a temperature coefficient of resistance, the change in temperature results in a change in resistance of the sensor. Equation (1) below shows how the resistance of the TCR wire changes with temperature for a given TCR ($\alpha_0$):

$$\frac{R_W}{R_0} - 1 = \alpha_0(T_W - T_0) \quad \text{Equation 1}$$

Ideally, it is desirable to measure only the resistance change due to the temperature change at the TCR sensor itself. However, the TCR sensor is attached to electrically conductive contacts in the head transducer and leads outside of the head transducer that also have a resistance. Equations (2) below shows how the measured resistance contains the TCR wire resistance of interest that is to be measured and also the contact resistance (i.e., resistance in the head transducer that may be exposed to the temperature from the TCR sensor or from the heater element) and the lead resistance (i.e., resistance outside of the head that is not exposed to the TCR sensor temperature or heater temperature).

In Equation (2) below, the first subscripts M, W, C, and L denote measured, wire, contacts, and leads resistance, respectively. The second subscripts, H and C, denote the hot and cold wire resistance measurement, respectively.

$$R_{M,H} = R_{W,H} + R_{C,H} + R_{L,H}$$

$$R_{M,C} = R_{W,C} + R_{C,C} + R_{L,C} \quad \text{Equations 2}$$

Equation (3) below shows how the TCR wire OHR depends on the measured resistance and the contact resistance. Equation (4) below uses Equation (1) above to substitute the temperature difference and TCR for the hot resistance of the contacts. Here, the constant and small leads resistance is neglected.

$$\frac{R_{W,H}}{R_{W,C}} - 1 = \frac{R_{M,H} - R_{C,H} - R_{L,H}}{R_{M,C} - R_{C,C} - R_{L,C}} - 1 \quad \text{Equation 3}$$

$$= \frac{R_{M,H} - R_{C,C}[\alpha_C(T_H - T_C) + 1]}{R_{M,C} - R_{C,C}} - 1 \quad \text{Equation 4}$$

It can be seen that the wire OHR (or TCR sensor signal) depends on the temperature the contacts are exposed to ($T_H T_C$), the TCR of the contacts ($\alpha_C$), and the cold resistance of the contacts ($R_{C,C}$). It is considered desirable to decrease the resistance of the contacts that are exposed to the temperature from the TCR sensor. As the resistance goes to zero, the portion of the OHR (or TCR sensor signal) due to the contacts goes to zero:

Referring to FIGS. 6A and 6B, there is shown finite element analysis modeling of a conventional resistance temperature sensor 200 showing hot TCR wire voltage/resistance (FIG. 6A) and temperature profile (FIG. 6B) across a TCR wire 202 and its electrically conductive contacts 204. FIGS. 6A and 6B show the voltage/resistance across one TCR wire design and the corresponding temperature contours when the wire-contacts system is run at a bias voltage of 150 mV (230 mW). FIGS. 6A and 6B are intended to represent a voltage/resistance and temperature profile across a conventional TCR wire 202 and its contacts 204. This particular TCR wire 202 has a resistance of ~34 ohms and the resistance in both contacts 204 directly adjacent to the TCR wire 202 where the voltage contour is seen (~the cross track width of the wire) is 18 ohms. At a bias of 150 mV, the average TCR wire temperature is 100° C. The average temperature in the region of the contacts 204 adjacent to the TCR wire 202 that has the 18 ohm resistance is 90° C. The surrounding head transducer temperature in this instance is 76° C.

Equation (5) below shows how the change in contacts temperature adjacent to the TCR wire 202 at the given contacts resistance adjacent to the TCR wire 202 impacts the measured OHR. The wire OHR is 17% higher than the measured OHR due to the impact of the contacts 204. In addition, Equation (6) below shows that the increase in resistance from the contacts 204 is 25% of the total increase in resistance of the TCR wire 202 and the contacts 204. The signal from the contacts 204 thus represents 25% of the total TCR sensor signal.

Equation 5
$$\frac{R_{M,H}}{R_{M,C}} - 1 = \frac{R_{W,C} + R_{C,H}}{R_{W,C} + R_{C,C}} - 1$$
$$= \frac{R_{W,C}[\alpha_C(T_H - T_C) + 1] + R_{C,C}[\alpha_C(T_H - T_C) + 1]}{R_{W,C} + R_{C,C}} - 1$$
$$= \frac{34[0.0026(100 - 76) + 1] + 18[0.0026(100 - 76) + 1]}{34 + 18} - 1$$
$$= 0.053$$

Equation 6
$$\frac{R_{W,H}}{R_{W,C}} - 1 = \frac{R_{W,C}[\alpha_C(T_H - T_C) + 1]}{R_{W,C}} - 1$$
$$= \frac{34[0.0026(100 - 76) + 1]}{34} - 1$$
$$= 0.062$$

Resistance increase of wire = $R_{W,C}[\alpha_C(T_H - T_C) + 1] - R_{W,C} = 2.1$ Resistance increase of contacts = $R_{C,C}[\alpha_C(T_H - T_C) + 1] - R_{C,C} = 0.7$ Embodiments of the disclosure are directed to implementations that reduce non-sensor contact resistance immediately next to hot TCR wire sensor for improved sensor-only signal generation. According to various embodiments, the area of the contacts immediately adjacent to the hot TCR wire is expanded to significantly drop the resistance, and therefore, the amount of signal that comes from the contacts.

In some embodiments, contacts are used that have a much larger cross sectional area adjacent to the sensor to drop the resistance of the contacts in that region. The resistance of a TCR wire is given in Equation (7) below. The term X is the resistivity, l is the TCR wire length, and $A_W$ is the cross-sectional area. According to Equation (7), increasing the cross-sectional area decreases the resistance of the section of the TCR wire or the contacts.

Equation 7
$$R = \frac{Xl}{A_w}$$

Figure 8:
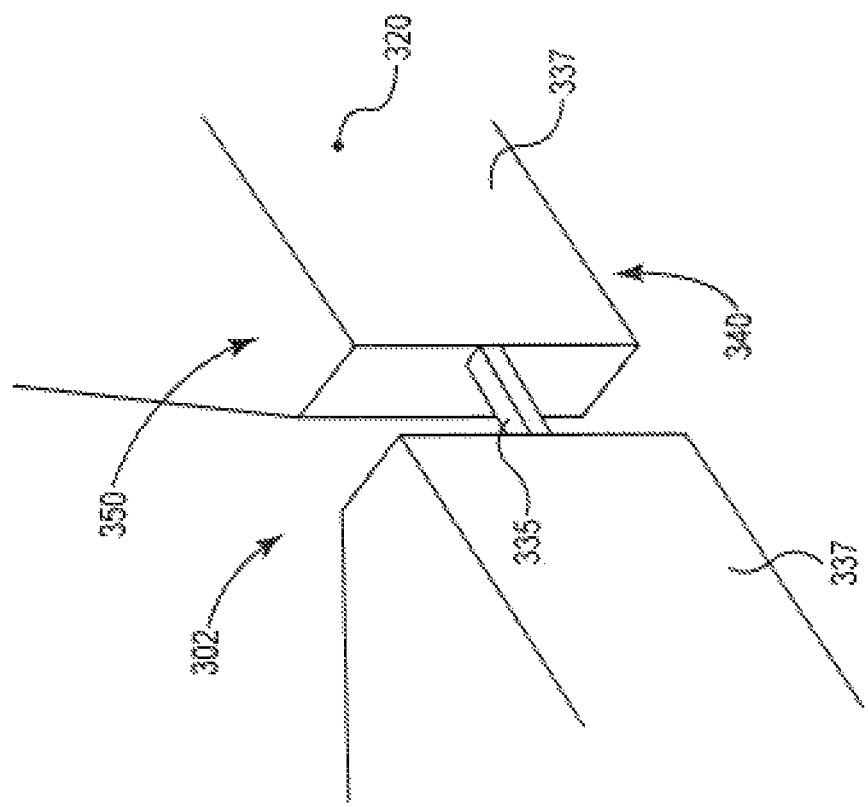
FIG. 8 illustrates a resistance temperature sensor with low-resistance contacts in accordance with various embodiments.
Figure 7:
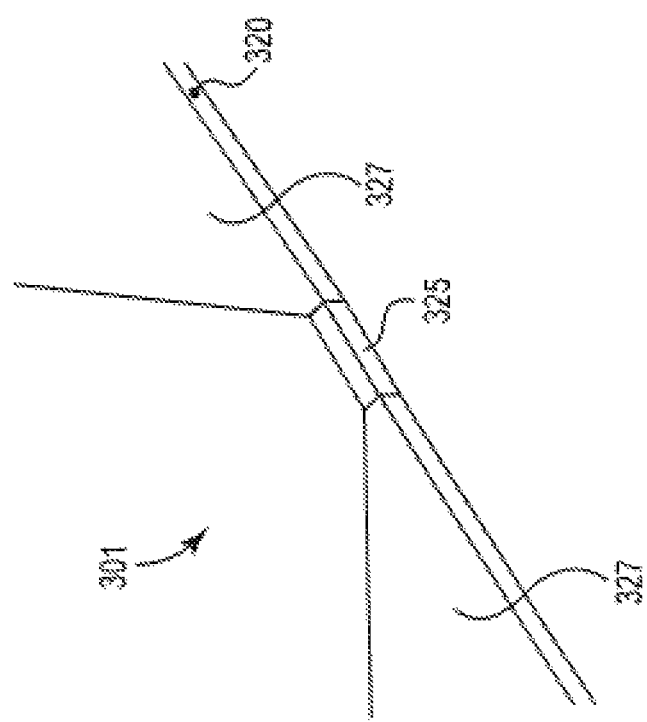
FIG. 7 illustrates a resistance temperature sensor of a conventional design.

FIG. 7 shows an illustrative example of a conventional TCR sensor 301 having a TCR wire 325 with adjacent contacts 327. A surface of the TCR wire 325 and contacts 327 are situated on an airbearing surface 320 of the head transducer. Traditionally, the contacts 327 have the same down track thickness of the TCR wire 325 and a slowly increasing-into-slider depth. FIG. 8 shows a representative example of resistive temperature sensor 302 having a low-contacts sensitivity TCR wire sensor 335 according to various embodiments, where the down track width and into-slider depth of the contacts 337 are significantly increased, which results in a decrease in the resistance of the contacts 337. In the embodiment shown in FIG. 8, the TCR sensor 302 includes a leading edge 340 and a trailing edge 350. The TRC wire 325 and the contacts 327 have a respective leading edge and trailing edge that are aligned co-parallel with the leading and trailing edges 340 and 350 of the TCR sensor 302. The leading edge of the TCR wire 335 is recessed relative to the leading edge of the contacts 337. The relative alignment and positioning of the respective TCR wire 335 and contacts 337, and the geometry of these elements, may be varied to achieve specified asperity and head-media spacing and/or contact detection performance characteristics.

According to various embodiments, a TCR sensor 302 is provided at a head transducer configured to interact with a magnetic recording medium. The TCR sensor 302 has a sensor resistance, and is configured to operate at a temperature above ambient temperature. The TCR sensor 302 is responsive to changes in spacing between the sensor 302 and the medium, collision with asperities of the medium, and head-medium contact, for example. Electrically conductive contacts 337 are connected to the TCR sensor 302 and have a contact resistance. The contacts 337 have a cross-sectional area adjacent to the sensor 302 larger than that of the sensor 302, such that the contact resistance is small relative to the sensor resistance and negligibly contributes to a signal generated by the TCR sensor 302. Preferably, the resistance of the contacts 337 is negligible relative to that of the TCR sensor 302.

Implementing a TCR sensor 302 to include low-resistance contacts 337 provides for an effective size of the sensor 302 that contributes to the sensor signal to be substantially the same as a physical size of the sensor 302. A TCR sensor 302 with low-resistance contacts 337 produces a sensor signal that is not confounded by a component of the signal contributed by the contacts 337. In some embodiments, a region of the contacts 337 are exposed to thermal energy produced by one or both of the TCR sensor 302 and a heater (not shown) of the head transducer. In this scenario, the contact resistance of the contact regions 337 is small relative to the sensor resistance and negligibly contributes to the signal generated by the TCR sensor 302.

It is understood that in various embodiments, the sensor element 335 and contacts 337 of a TCR sensor 302 may define different regions of a unitary TCR structure. For example, the TCR sensor 302 may have opposing ends between which a TCR sensor element 335 is located. The opposing ends of the TCR sensor 302 have a cross-sectional area larger than that of the sensor element 335. In such embodiments, the contacts 337 comprise or otherwise include the opposing ends of the sensor 302.

According to various embodiments, the contacts 337 may have a cross-sectional area adjacent to the TCR sensor 335 which is larger than that of the sensor 335 by a factor ranging between 1 and 1000. In various embodiments, the contact resistance is smaller than the sensor resistance by a factor ranging between 1 and 1000. In various embodiments, the TCR sensor 335 is configured to operate at a temperature ranging between about 25 and 300° C., with a typical operating temperature of about 100° C. In other embodiments, the TCR sensor 335 is configured to operate at a temperature ranging between about 0 and 300° C. above an ambient temperature of the magnetic recording medium and surrounding environment, which typically ranges between 25 and 75° C.

In FIG. 7, the conventional TCR wire sensor 301 is shown to have narrow contacts 327. FIG. 8 shows a TCR wire sensor 302, according to embodiments of the disclosure, with large cross-sectional area contacts 337 to significantly drop contact resistance. The specific geometry given in FIG. 8 represents one possible implementation, it being understood that any geometry that increases the cross-sectional area of the contacts 337 relative to the cross-sectional area of the TCR wire 335 can be used. Finite element analysis modeling can be used to define the optimal geometry for any particular sensor design. The TRC sensor 302 is preferably situated at or near a close point of the head transducer. In various embodiments, the TCR wire 335 is dimensioned to sense for asperities of magnetic recording media.

Figure 9A:
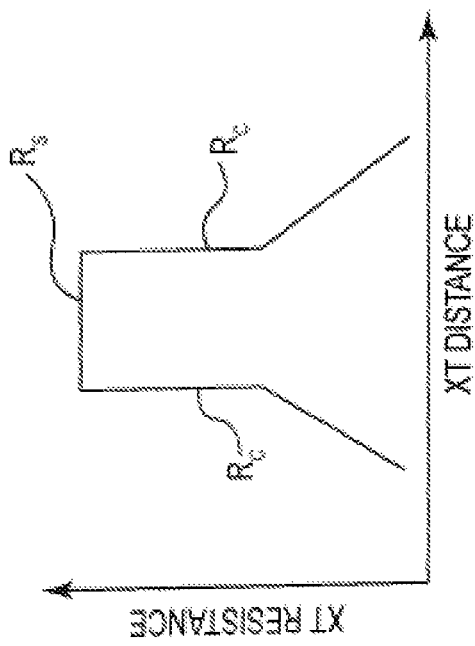
FIG. 9A is a graphical illustration showing a cross-track resistance profile of a conventional resistance temperature sensor.
Figure 10A:
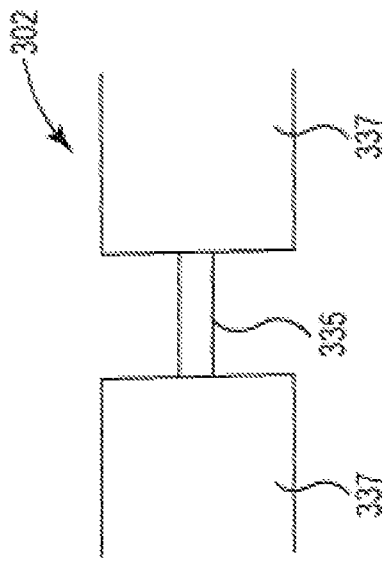
FIG. 10A is a graphical illustration showing a decrease in cross-track resistance of a resistance temperature sensor due to an increase in cross-sectional contact area in accordance with various embodiments.
Figure 9B:
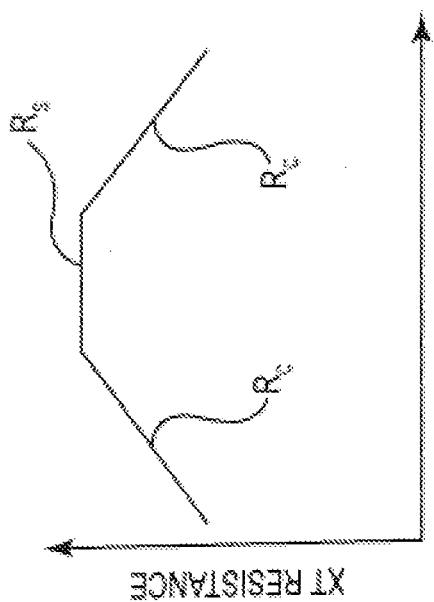
FIG. 9B is an airbearing surface view of a conventional resistance temperature sensor that has a cross-track resistance profile as shown in FIG. 9A.
Figure 10B:
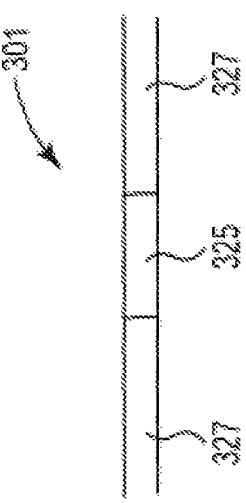
FIG. 10B is an airbearing surface view of a resistance temperature sensor that has a cross-track resistance profile as shown in FIG. 10A in accordance with various embodiments.

FIGS. 9A and 10A are schematic representations of the relative resistance of two TCR wire sensors 301 and 302, shown in FIGS. 9B and 10B, and their associated contacts 327 and 337 as a function of cross-track location. FIG. 9A shows a cross-track resistance profile of conventional TRC sensor 301 having contacts 327 with a relatively small cross-sectional area. FIG. 10A shows a cross-track resistance profile of TRC sensor 302 having low-sensitivity TCR wire contacts with a relatively large cross-sectional area according to embodiments of the disclosure.

The theoretical contact resistance of the conventional sensor of FIG. 9B decreases monotonically from the sensor resistance value. The theoretical contact resistance of the low-sensitivity contacts of the TCR sensor 302 of FIG. 10B drops immediately and decreases much more rapidly than in conventional designs. As such, the signal from the contacts 337 is greatly reduced to between 0 and 40 dB or greater depending on geometry.

In general, there is a very large head-to-head variance in asperity and contact detect signals when using hot TCR wire sensors at a fixed electrical bias (i.e., fixed current, power or voltage). Part of the signal variance comes from head-to-head variance of the temperature of the TCR wire due to geometry and heat transfer changes across the sensors and head transducers. Such head-to-head variance results in a signal amplitude variance for a fixed detection event from head-to-head.

Figure 11:
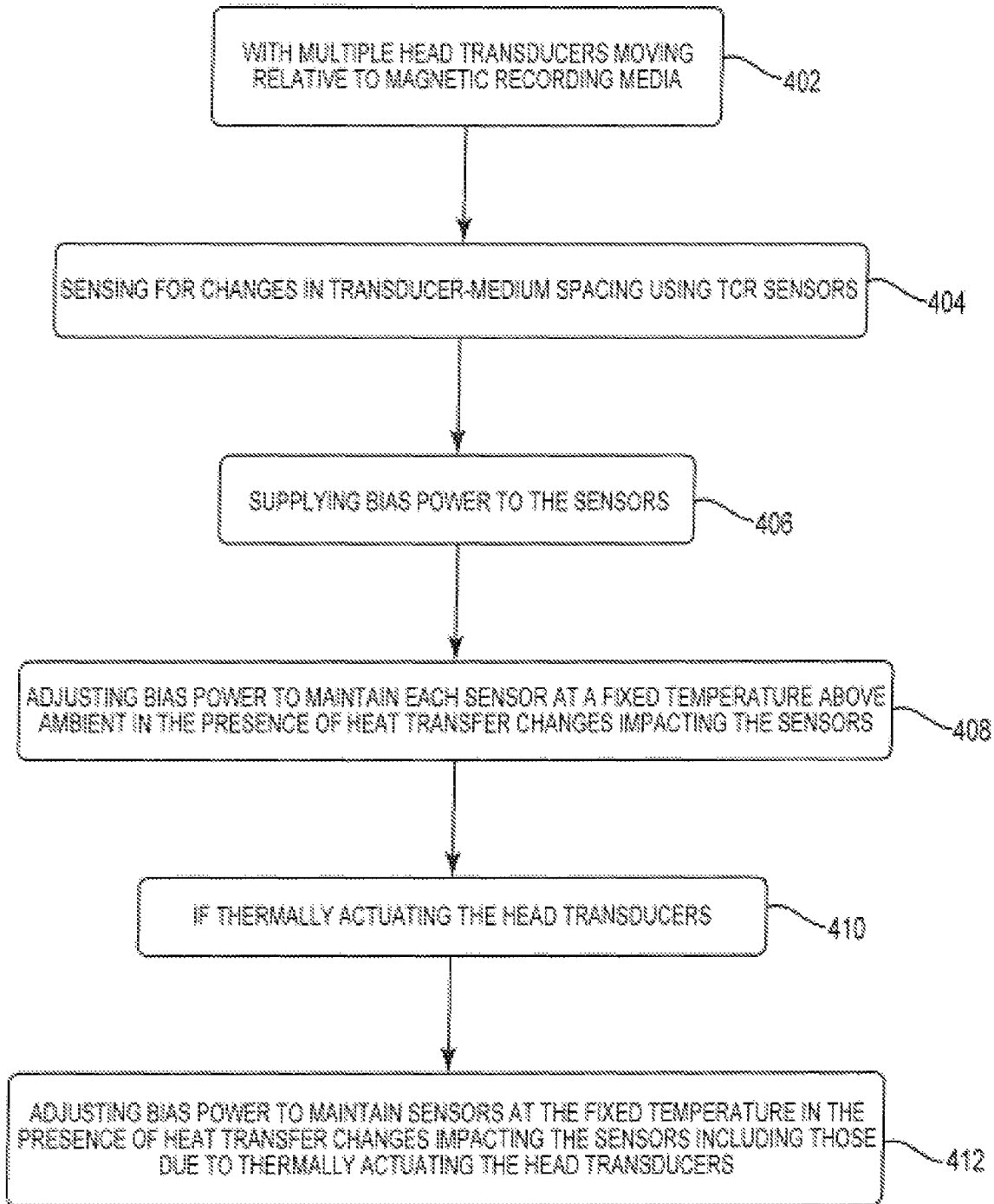
FIG. 11 is a flow chart showing various processes for maintaining each of a multiplicity of resistance temperature sensors across a multiplicity of head transducers at a fixed temperature in the presence of heat transfer changes impacting the sensors in accordance with various embodiments.

FIG. 11 is a flow chart showing various processes for maintaining each of a multiplicity of resistance temperature sensors across a multiplicity of head transducers at a fixed temperature in the presence of heat transfer changes impacting the sensors in accordance with various embodiments. With the head transducer moving 180 relative to a magnetic recording media, the method illustrated in FIG. 11 involves sensing 182 for changes in head-medium spacing using TCR wire sensors, with bias power being supplied 183 to the TCR wire sensors. The method also involves adjusting 184 bias power to maintain each TCR wire sensor at a fixed temperature above ambient in the presence of heat transfer changes impacting the sensors. If the head transducers are thermally actuated 186, the method further involves adjusting 188 bias power to maintain TCR wire sensors at the fixed temperature in the presence of heat transfer changes impacting the sensors including those due to thermally actuating the head transducers.

FIGS. 12A and 12B show a representative multiple head TCR wire sensor contact detection response as a function of wire bias current (FIG. 12A) and wire OHR/temperature (FIG. 12B) over the same bias range. At hotter temperatures (higher biases or OHRs), the contact detection response signal-to-noise response (SNR) across TCR wire sensors is more consistent when the TCR wire sensors are run at a fixed OHR/temperature across the head transducers.

Figures 13A, 13B:
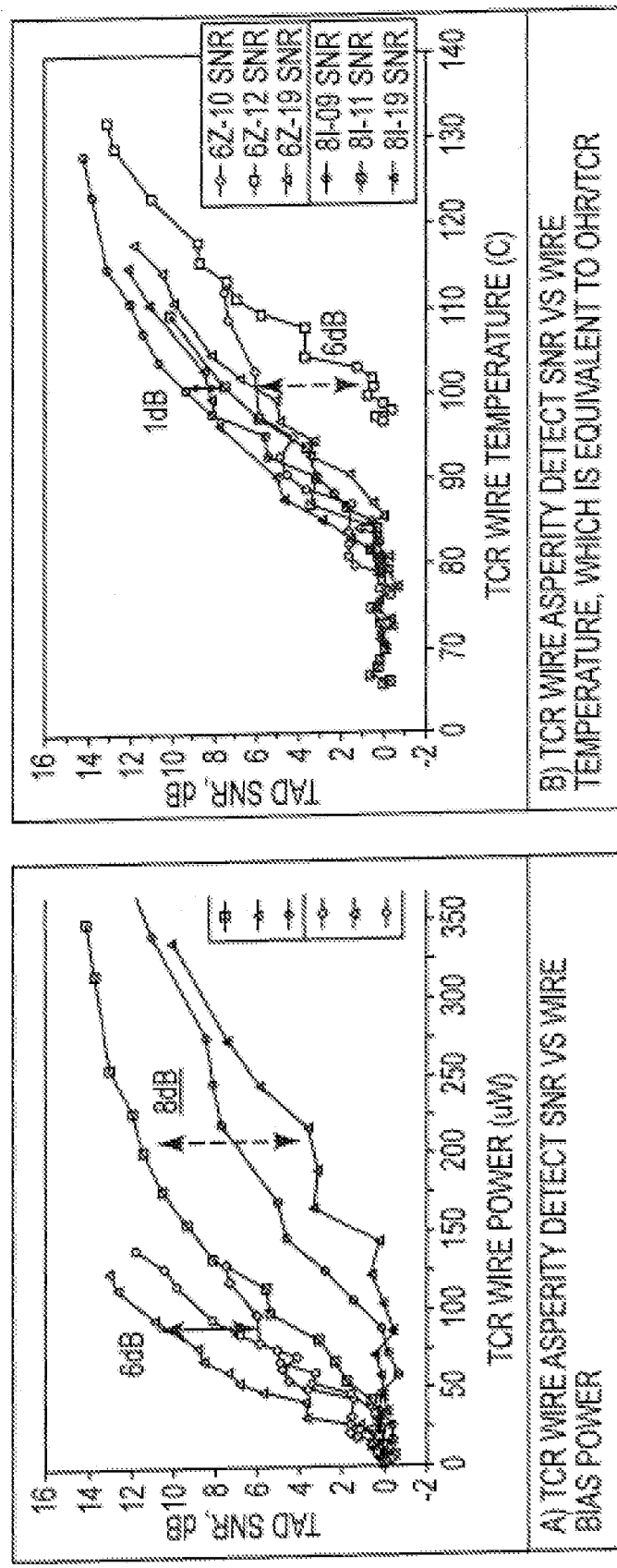
FIG. 13A shows an asperity detection response of a multiplicity of resistance temperature sensor as a function of sensor bias current.
FIG. 13B shows an asperity detection response of a multiplicity of resistance temperature sensor as a function of sensor overheat ratio (OHR)/temperature.

FIGS. 13A and 13B show representative TCR wire sensor asperity SNR data on multiple head transducers. More particularly, FIGS. 13A and 13B show representative multiple head TCR wire sensor asperity detection SNR data as a function of TCR wire bias power (FIG. 13A) and wire sensor OHR/temperature (FIG. 13B). It can be seen that the asperity detection response across head transducers is more consistent when the TCR wire sensors are run at a fixed OHR/temperature across the head transducers.

Embodiments of the disclosure are directed to apparatuses and methods for biasing each TCR wire sensor to provide for a fixed temperature across all TCR wire sensors of the head transducers. According to various embodiments, each TCR wire sensor is run at a fixed temperature to eliminate the head-to-head variance in asperity and contact detection signals that come from the varying temperature across the TCR wire sensors. The TCR wire sensors can be used to measure temperature by measuring the change in resistance of the TCR wire, which is a function of the change in temperature of the TCR wire, as is shown in Equation (8) as follows:

$$\frac{R_W}{R_0} - 1 = \alpha_0(T_W - T_0) \qquad \text{Equation 8}$$

In Equation (8) above, $R_W$ and $T_W$ are the hot resistance and temperature respectively; $R_0$ and $T_0$ are the cold resistance and temperature respectively, and $\alpha_0$ is the temperature coefficient of resistance of the TCR wire. The TCR, $\alpha_0$, is a material property and therefore the value of the OHR for a fixed TCR wire temperature changes with material.

Equation (8) is the linearized form and higher order terms can exist for nonstandard materials. In addition, this assumes a uniform temperature and resistance across the TCR wire sensor. If the TCR wire and resistance is not uniform, then only the small element differential form of this equation holds as highlighted in Equation (9) below:

$$\frac{dR_W}{dR_0} - 1 = \alpha_0(dT_W - dT_0) \qquad \text{Equation 9}$$

where $dR_{(x,y,z)}$ and $dT_{(x,y,z)}$ are the small uniform element resistance and temperature. If the temperature distribution or resistance changes across the TCR wire, then the differential equation will have to be integrated over the sensor and the precise relationship with maximum or average TCR wire temperature established using a model.

Figure 14:
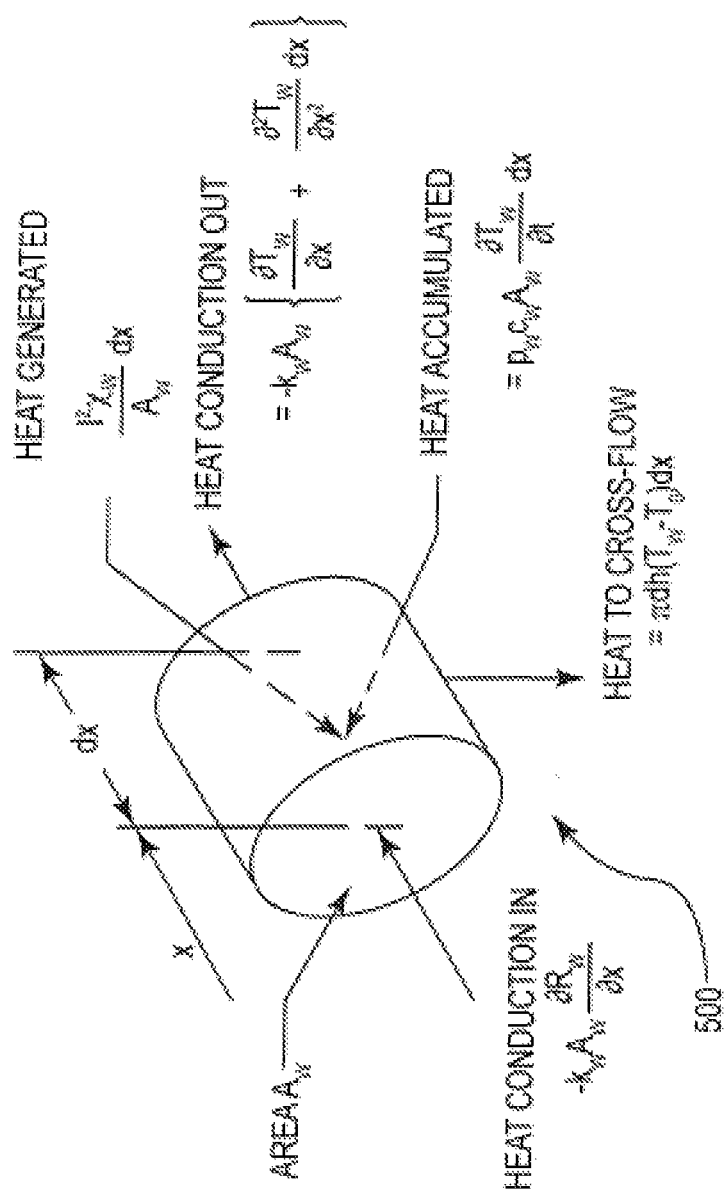
FIG. 14 is an illustrative example of heat-transfer balance for a hot resistance temperature sensor wire consistent with a similar diagram from Bruun, Hot-wire Anemometry: Principles and Signal Response, 1995.

In some operational scenarios, it is advantageous to heat these TCR wires up above the ambient temperature by applying a bias power to the wire. FIG. 14 shows an illustrative heat transfer balance example for a wire suspended in air consistent with a similar diagram from Bruun, Hot-wire Anemometry: Principles and Signal Response, 1995. Here, it is clear that the temperature of the TCR wire not only depends on Joule heating ($I^2R$), but also on the various modes of heat transfer from the TCR wire.

Because the temperature at the TCR wire depends on Joule heating and the heat transfer from the wire, the temperature at the TCR wire is not fixed across varying heads with a fixed wire bias power. Therefore, to run each TCR wire sensor at the same temperature, the bias power has to be adjusted so that the overheat ratio, OHR, has the same value (for a fixed material). For a design that has a uniform temperature and resistance across the sensor, Equation (10) below can be used:

$$OHR = \frac{R_W}{R_0} - 1 = \alpha_H(T_W - T_0) \qquad \text{Equation 10}$$

For a design that has a significant temperature and/or resistance gradient, the function form only strictly holds for small elements, as highlighted in Equation (11) below:

$$dOHR = \frac{dR_W}{dR_0} - 1 = \alpha_0(dT_W - dT_0) \qquad \text{Equation 11}$$

It is noted that using the uniform equation (Equation (10) above) will result in an error that may, or may not, be acceptable.

Figure 15:
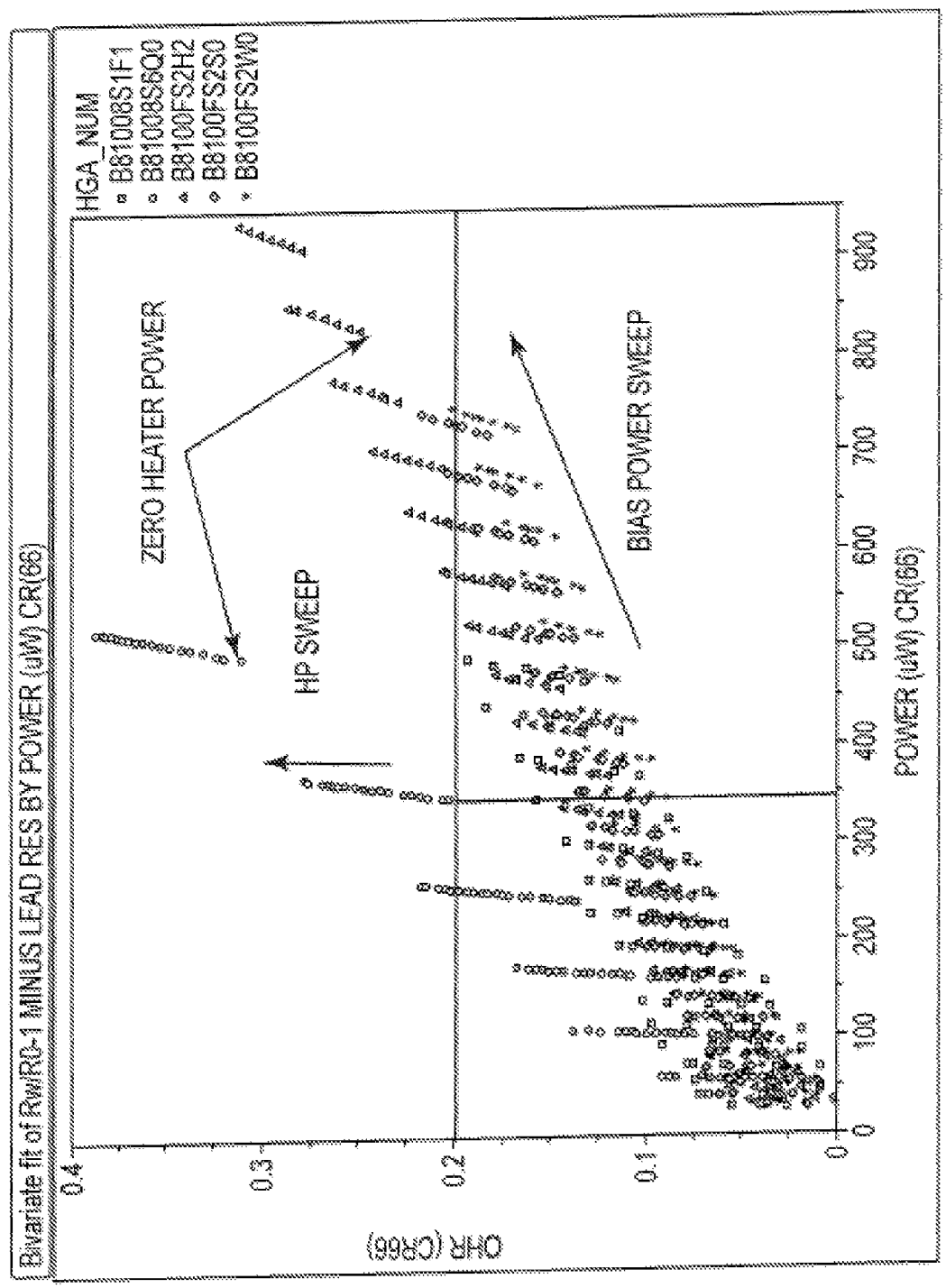
FIG. 15 is a graph showing OHR versus resistance temperature sensor bias power for a multiplicity of head transducers, the graph demonstrating that running multiple resistance temperature sensors at a fixed OHR rather than a fixed bias power, bias current or bias voltage is advantageous.

FIG. 15 shows a graph of the OHR versus wire bias power for a collection of head transducers (e.g., five head transducers). In FIG. 15, each head transducer was run at multiple heater powers (HP sweep), with OHR=$R_W/R_0$-1. Here, the temperature at the TCR wire comes from both wire bias (abscissa) and the heater (increasing OHR at a fixed wire current). The variance in the OHR across head transducers at a fixed TCR wire bias power and heater power is readily seen in FIG. 15, and can lead to significant differences in the temperature of the TCR wire across the head transducers.

It is noted that the zero heater power condition is the lowest point at each TCR wire bias power. For example, the OHR of head transducer S6Q0 at 345 μW and zero heater power is ~0.2. The OHR of head transducer S2W0 at 345 μW and zero heater power is ~0.09. That is, head transducer S6Q0 has an OHR 2.2 time that of head transducer S2W0. This translates to a 73° C. temperature difference at the TCR wire with no heater power for these head transducers.

In order to achieve consistent head-to-head operation and reliability of hot TCR sensors, it is desirable to run each TCR wire sensor at a fixed OHR (e.g., the horizontal line in FIG. 15) than at a fixed wire bias power (e.g., the vertical line in FIG. 15), or fixed wire bias current or voltage, which do not account for heat transfer changes across the TCR wire sensor of the head transducers.

The following are representative examples of methods for setting a fixed OHR, assuming uniform TCR wire temperature and resistance (see, e.g., Equation (10) above):

Example 1

A representative in situ method is given as follows:
1. Measure the "cold" or ambient TCR wire resistance ($R_0$).
2. Increase the TCR wire bias power while measuring the increased "hot" wire resistance ($R_W$).
3. Calculate OHR using Equation (10) above.
4. Use the TCR wire bias power, or current, or voltage that gives the desired OHR.

Example 2

A simpler interpolation or extrapolation method is given as follows:
1. Measure the resistance of the TCR wire at two (or more) wire bias powers.
2. Fit a line to the data and determine the $R_W$ vs. wire bias power slope and intercept.
3. Use the intercept as $R_0$.
4. Solve the operating TCR wire power using the inverse equation in Equation (9) above and the desired OHR, the calculated slope, and the calculated intercept.

However, $R_0$ in the representative methods of Examples 1 and 2 above can have significant errors due to measurement accuracies at low biases. For example, at 100 μA, the measured resistance has significant variation (~2 Ohms). On this same system, the current required to obtain a more accurate resistance measurement is 500 μA, which heats up the TCR wire. Below is another representative method for finding the bias for fixed OHR with short testing time and low $R_0$ error.

Example 3

Figure 16:
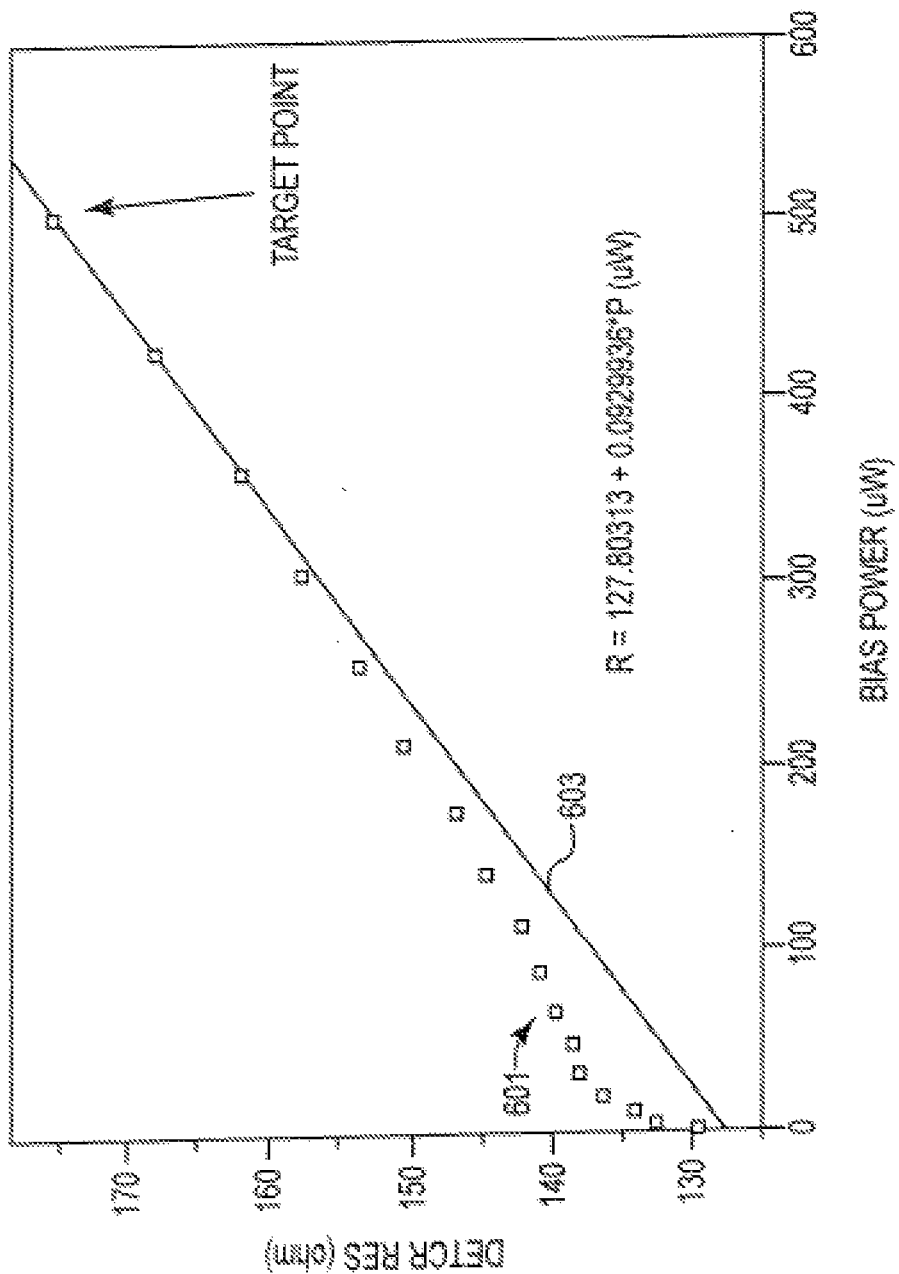
FIG. 16 is a graph showing resistance of a resistance temperature sensor versus bios power in accordance with various embodiments.

1. Pre Bias Scan: measure TCR wire resistance with the bias current sweeping from 100 μA to target current (TC) at 100 μA step. The TC is an initial estimate of the current needed to achieve the desired OHR.
2. Get the Target Bias Power for Fixed OHR: Plot $R_W$ vs. wire bias power as shown in FIG. 16. Note that at low bias, the curve 601 is not linear because of poor resistance measurement accuracy. One can take three points with bias current at TC, TC-100, TC-200 for linear fit 603 to arrive at the equation of $R_w$=aP+b. Here $R_w$ is the TCR wire resistance, P is the bias power, a is the slope, and b is the intercept. Since power is proportional to the delta temperature ($T_w - T_0$), the preceding linear fit equation can be rewritten as in Equation (12) below:

$$R_W = \alpha_0 R_0 (T_W - T_0) + R_0 \propto \alpha_0 R_0 P + R_0 \qquad \text{Equation 12}$$

Comparing Equation (10) above to the linear fit equation $R_w$=aP+b reveals that the slope a is the function of TCR, and the intercept b is eventually the cold resistance at zero bias. The following calculation can be used to obtain the bias power for fixed OHR:
  a) get target TCR wire sensor resistance at fixed OHR: $R_w$=b*(OHR+1)
  b) substitute $R_w$ into the linear fit Equation (12) above for target bias power given by: P=($R_w$-b)/a.
3. Convert the target bias power to either bias current or voltage depending on operation feasibility.
4. If necessary, limit the target bias within reliability limit, such as a voltage limit from TCR wire sensor life testing.

With further reference to FIG. 16, this figure shows an example of setting a fixed OHR for a head transducer from a particular wafer, from which the following fitting equation is obtained: R=127.803+0.092994*P. Here, the slope a=0.092994±0.000796, and the intercept b=127.803±0.348. If, for example, the fixed OHR=0.3, using the methods described above, the bias power should be set at P=412.294±2.406 μW.

Additionally, setting the OHR across TCR wire sensors can also be expanded to setting the OHR across other parameters in the system, such as radius/skew. Using a multi-heat source thermo-mechanical model (MXTM), it was found that a drop in contact detection response across the skew results when the head transducer is run at a fixed TCR wire bias power. Results from MXTM modeling have also shown a change in resistance at the TCR wire as a function of heater power across the skew. It was observed that the OD (outer diameter) skew conditions deviate more than those at the ID (inner diameter), suggesting there is a relatively larger amount of cooling occurring at the OD. The increase in cooling at the OD was observed to be ~3× higher at the OD than the ID. Similarly, the contact detection response at the OD was observed to be ~3× that of the ID. The static heat transfer across the skew can be made more consistent if the OHR is adjusted across skew.

It should be noted that, because of the multiple heat sources in the transducer and the different resistivities and TCRs of the sensor and contacts, the simple methods described above may result in appreciable errors when attempting to fix a constant temperature for the TCR wire sensors across all head transducers. Additional implementations could be used to improve the technique, such as:
1. The temperature increase from the heater and/or ambient can be included in the calculation; i.e., measuring the resistance increase from both the TCR wire bias and heater to set a fixed OHR.
2. The OHR could be recalculated and set based on how the system changes; for example, across radius or time if the TCR wire sensor response decays with time.
3. If the contacts change resistance across the parameter the OHR is being used to normalize, then the change in the contact resistance must be accounted for.
4. A model could be used to understand how much a non-uniform temperature and resistance gradient changes the accuracy of the desired temperature setting.

According to various embodiments, methods of setting a more accurate OHR and consistent wire temperature involve using modeling to account for non-uniform sensor temperatures, resistances, and heat from the transducer heater. FIGS. 17A-17D show different ways of estimating the maximum temperature in a TCR wire sensor according to various embodiments. As can be seen in these figures, the most accurate method of estimating the maximum temperature is by monitoring the OHR in the TCR wire and the heater power (see FIG. 17D, 17G or 17I). Accurately estimating maximum power is important for reliability purposes, in particular for DLC integrity.

Figure 17E:
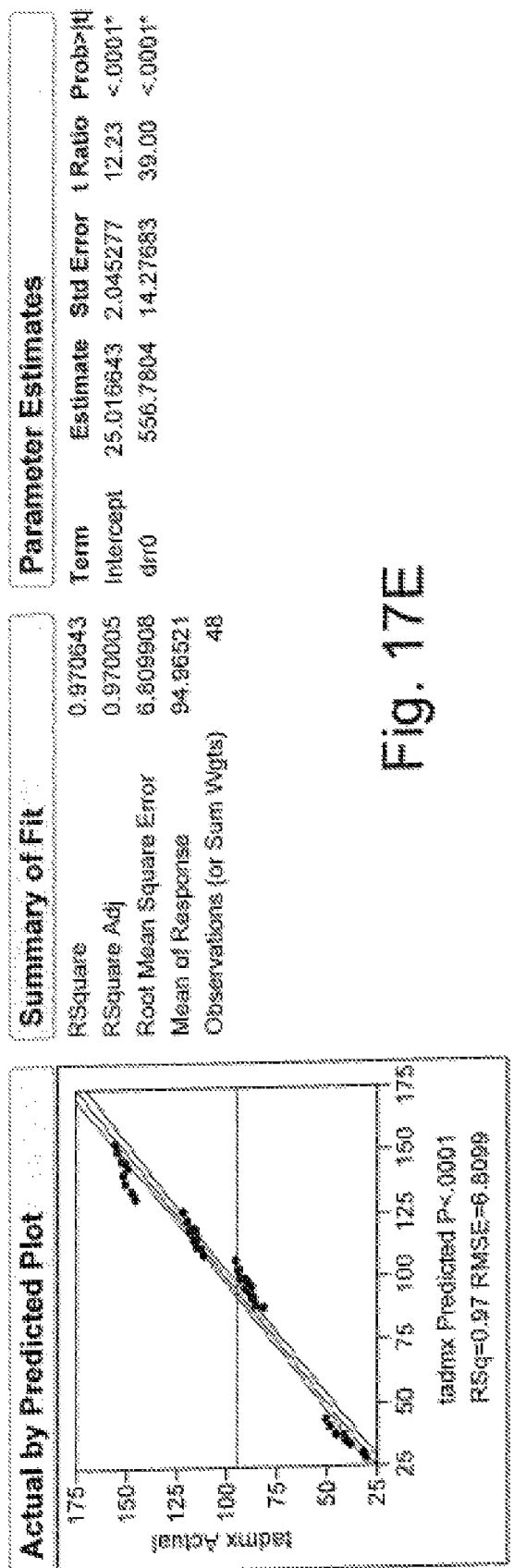
Figure 17F:
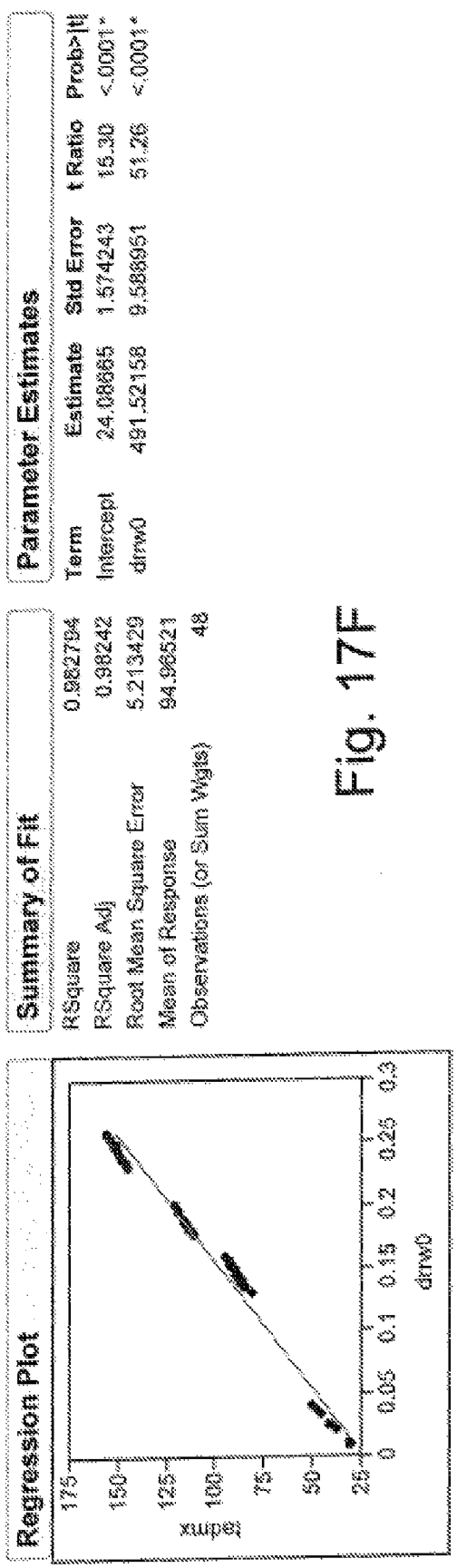

FIGS. 17A-17I show modeled maximum TCR wire temperature versus different variables, as follows: FIG. 17A shows maximum TCR wire temperature vs. wire power; FIG. 17B (and larger version FIG. 17E) shows maximum TCR wire temperature vs. total overheat ratio (leads and wire); FIG. 17C (and larger version FIG. 17F) shows maximum TCR wire temperature vs. wire overheat ratio; and FIG. 17D (and larger version FIG. 17G) shows maximum TCR wire temperature vs. wire overheat ratio and writer heater power.

FIGS. 17A-17G show regressions of the maximum wire temperature predicted by the MXTM model versus different input variables. Modeling using the MXTM model was performed on a collection of heads that span most manufacturing parameter distributions including TCR wire sensor height, to simulate realistically manufactured heads. Therefore, the necessary heater power to contact the media varies from head to head.

The maximum temperature of the wire is due to energizing both the TCR wire sensor and the writer heater. As a result, higher flying and/or lower efficiency heads necessitate larger heater power to contact the media, hence producing larger maximum wire temperatures when the voltage across the TCR wire sensor is maintained constant.

Figure 17G:
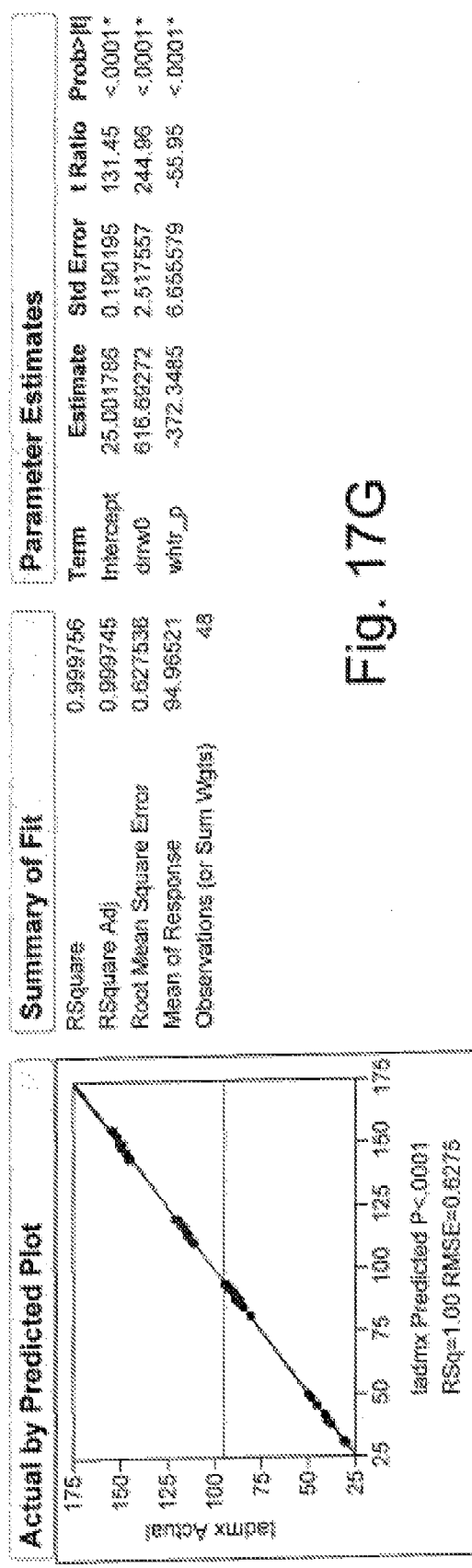
Figure 17H:
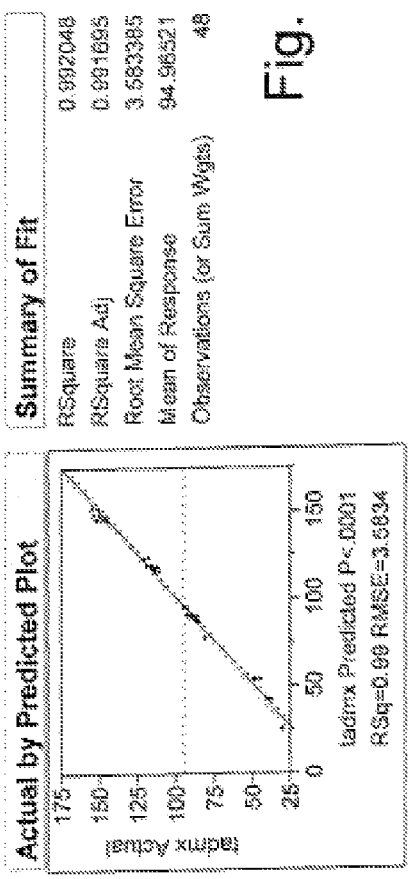
Figure 17I:
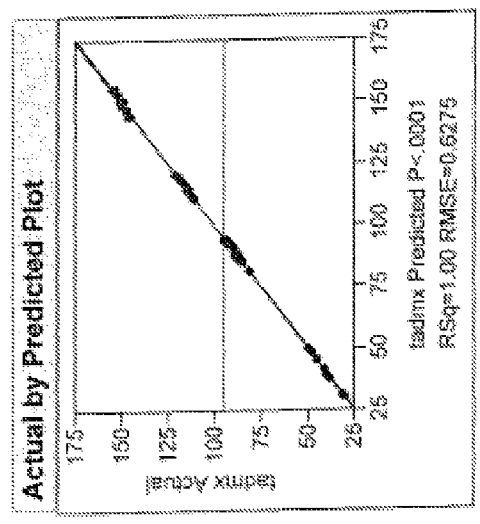

The regressions in FIGS. 17A-17D are ordered in increasing correlation level, and indicate that the best way to predict temperatures in the TCR wire is via the OHR in the wire and the heater power (FIG. 17D and larger version FIG. 17G, which is the same as FIG. 17I). This result, together with the fact that TCR wire contact detection SNR is more consistent with OHR, suggests that SNR consistency across heads is improved by setting TCR wire sensor temperatures constant across all heads.

FIGS. 17H and 17I show modeled maximum wire temperature as follows: FIG. 17H shows maximum TCR wire temperature vs. wire voltage and heater power; and FIG. 17I shows maximum TCR wire temperature vs. OHR and heater power. The regression of the modeled maximum wire temperature vs. wire voltage and heater power shown in FIG. 17H indicates that TCR wire temperature prediction using wire voltage and heater power is very good. However, this wire temperature prediction is not as accurate as when using OHR and heater power (FIG. 17I), as shown by the root mean square of the error (RMSE) of the two methods which differ roughly by a factor of five.

Another important observation from the parameter estimates is that the sign of the coefficient relating wire temperature to voltage is positive (FIG. 17H), whereas the sign of the coefficient relating wire temperature to OHR is negative (FIG. 17I). This indicates that to achieve constant maximum temperature across all parts, higher power to contact parts needs to be set at a higher OHR than lower power to contact parts.

Figure 18:
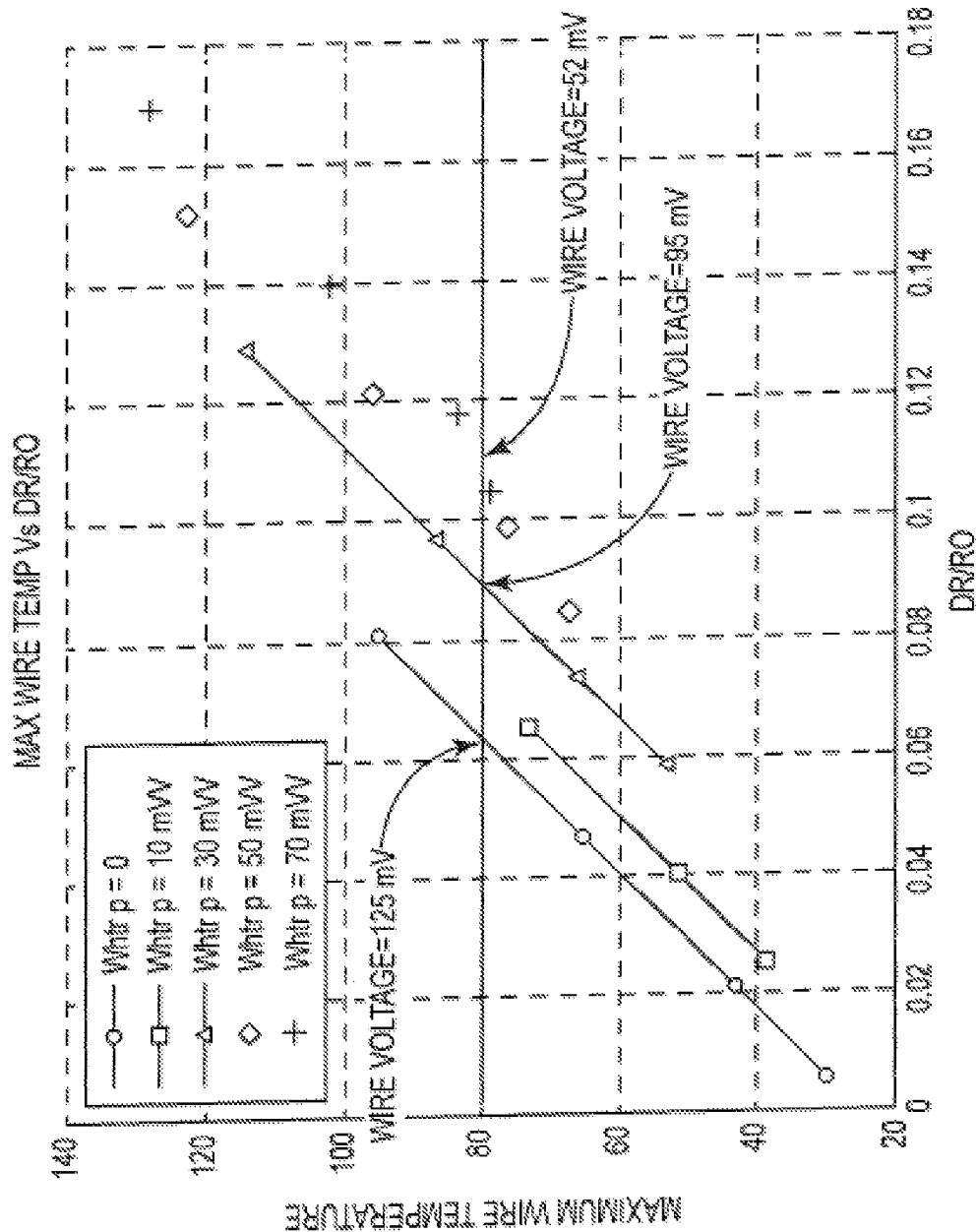
FIG. 18 is a graph of maximum resistance temperature sensor resistance versus OHR for different head transducer heater powers.

FIG. 18 shows plots of modeled maximum wire temperature vs. OHR for different heater powers. The reason for the seemingly illogical data plots in FIG. 18 results from the fact that the OHR is also a function of heater power. That is, the temperature distribution across the TCR wire sensor changes with heater power. To maintain a constant maximum temperature as the heater power increases, the OHR ratio also has to increase. For example, to achieve a constant maximum wire temperature of 80° C. as the heater power increases from 0 mW to 30 mW to 70 mW, the OHR increases from 0.062 to 0.09 to 0.11% and the wire voltage needs to drop from 125 mV to 95 mV to 52 mV.

Conventional TCR wire sensors for asperity and head-media contact detection are orientated with the length of the TCR wire in the cross-track direction. There are at least three problems associated with this geometry. First, the cross-track length of the TCR wire defines the smallest cross-track width of asperity characterization. Asperities that are smaller than the cross-track wire length cannot be accurately characterized in the cross-track direction. This will result in more track "padding" than necessary and will result in an unnecessary loss of drive capacity. Track padding, in this context refers to regions of a track (or the disk in general) that cannot be accurately characterized and therefore, could potentially include asperities or other media defects. These uncharacterized regions of a track or disk surface are avoided during active flight of the recording head transducers, resulting in reduced storage capacity.

Second, once an asperity is detected and characterized, more tracks than the asperity cross-track width are padded to account for the cross-track widths of the functional elements of the head transducer. Because a conventional TCR wire sensor is orientated in the cross-track direction, the amount of tracks needed to pad the TCR wire sensor is larger than the amount of tracks needed for the writer and reader. Third, both the first and second problems discussed above suggest that the direction of goodness for the length of the TCR wire is shorter. However, from a sensor SNR viewpoint, the longer the TCR wire the better. Therefore, it is not possible to fully optimize a TCR wire sensor for both asperity/contact detection and accurate asperity cross-track characterization.

Embodiments of the disclosure are directed to a TCR wire sensor that is oriented parallel to the track, which provides for increased asperity resolution and a decrease in track padding for increased drive capacity. According to various embodiments, a TCR wire sensor is oriented parallel to the track, in contrast to conventional TCR wire sensors that are orientated in the cross-track direction.

Figure 19:
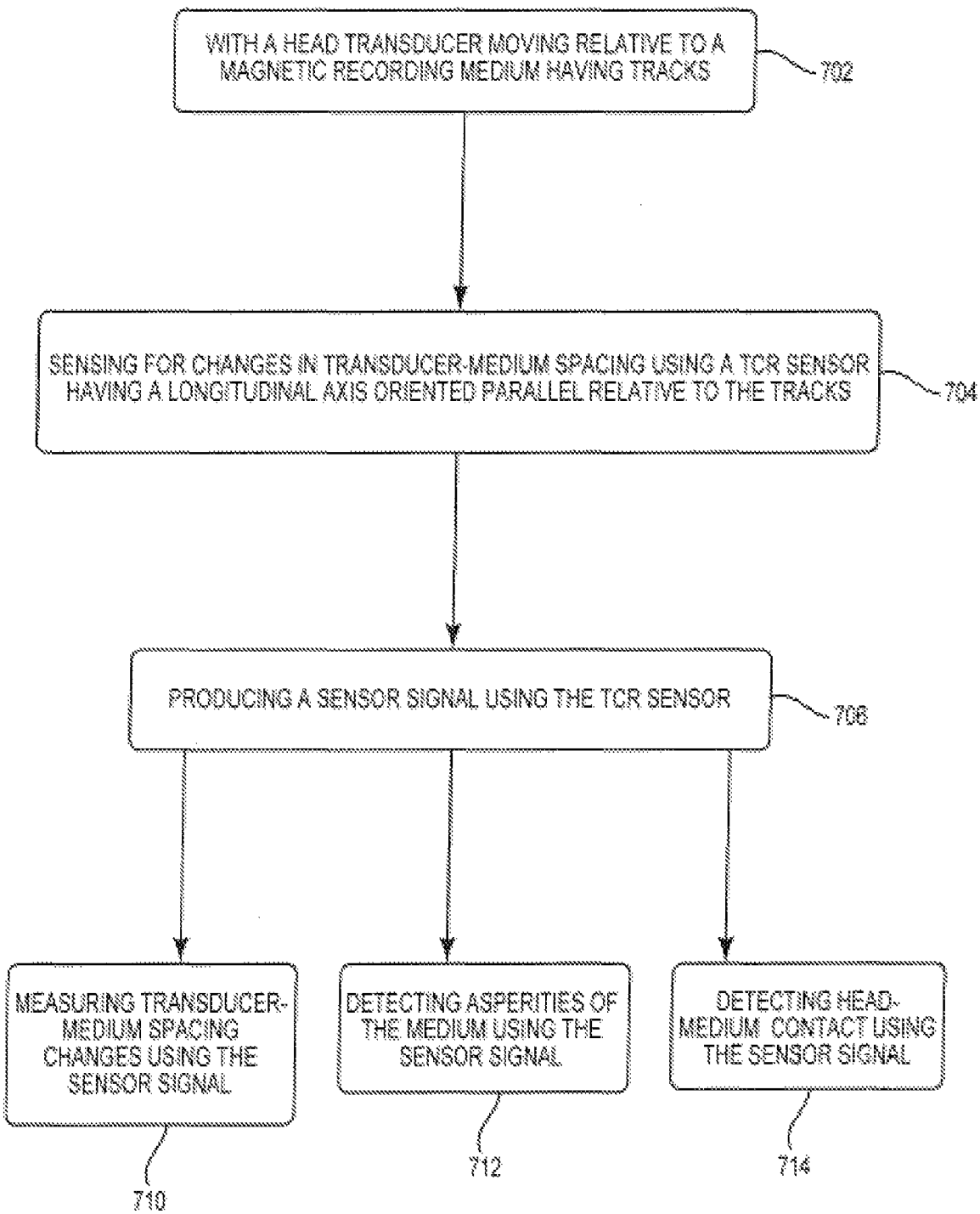
FIG. 19 is a flow chart showing various processes for sensing for asperities, changes in head-media spacing, and/or head-media contact using a TCR wire sensor having a longitudinal axis oriented parallel relative to tracks of a magnetic recording medium in accordance with various embodiments.

FIG. 19 is a flow chart showing various processes for sensing for asperities, changes in head-medium spacing, and/or head-media contact using a TCR wire sensor having a longitudinal axis oriented parallel relative to tracks of a magnetic recording medium in accordance with various embodiments. With the head transducer moving 702 relative to a magnetic recording medium, the method illustrated in FIG. 19 involves sensing 704 sensing for changes in head-medium spacing using a TCR wire sensor having a longitudinal axis oriented parallel relative to the tracks of the medium. The method also involves producing 706 a sensor signal using the TCR sensor, which can be used for a variety of purposes, including detecting 712 asperities of the medium, measuring 710 head-medium spacing changes, and detecting 714 head-medium contact, for example.

Figure 21:
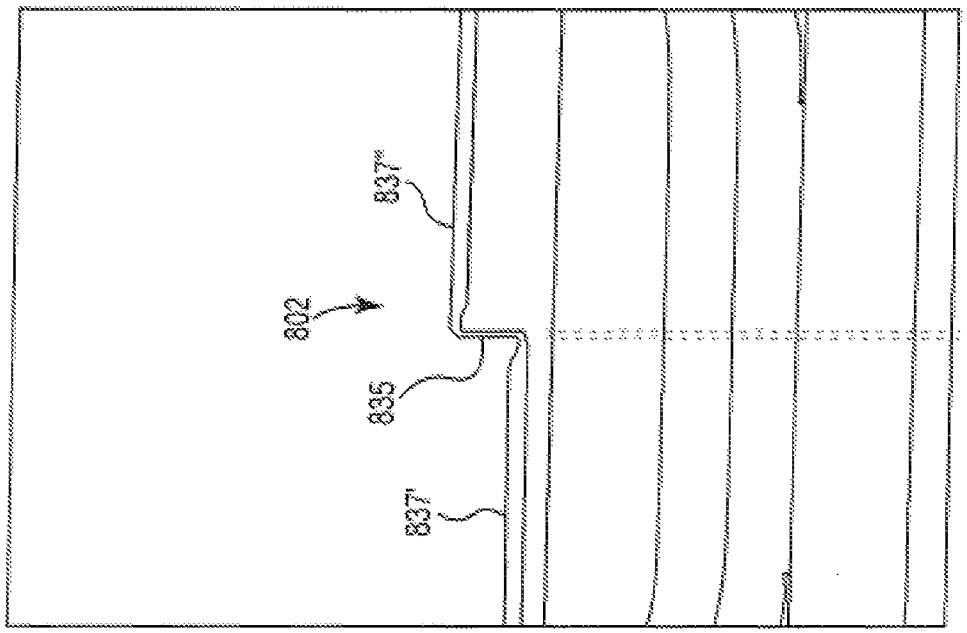
FIG. 21 is an image of a track-parallel resistance temperature sensor in accordance with various embodiments.
Figure 20:
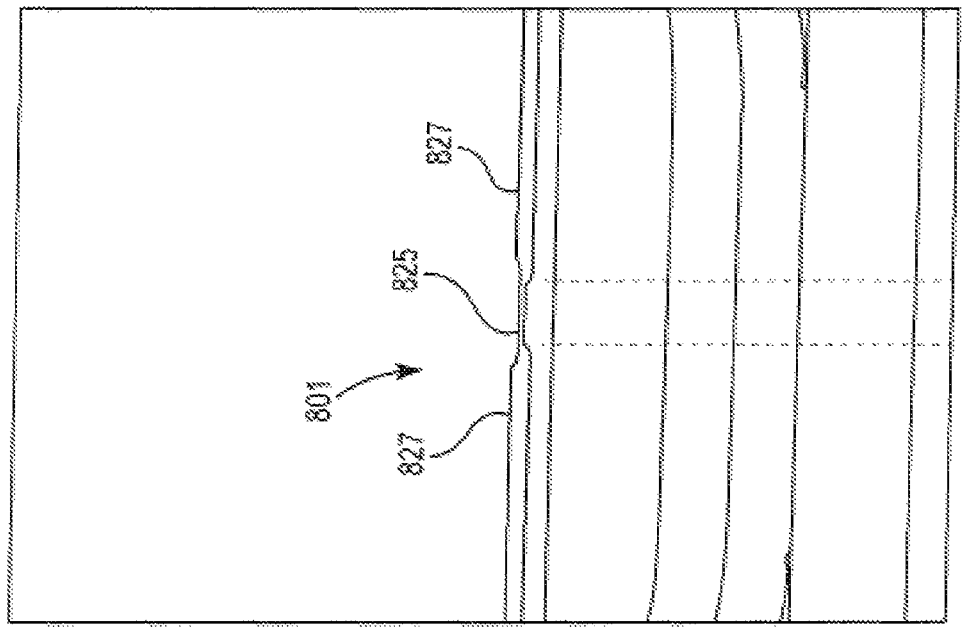
FIG. 20 is an image of a conventional cross-track oriented resistance temperature sensor.

FIG. 20 shows an image of a conventional cross-track orientated TCR wire sensor 801 comprising a TCR wire 825 connected to electrically conductive contacts 827. It can be seen in FIG. 20 that, in a conventional TCR wire sensor 801, the TCR wire 825 and contacts 827 are generally parallel to one another. FIG. 21 shows an image of a track-parallel TCR wire sensor 802 in accordance with various embodiments of the disclosure. The TCR wire sensor 802 shown in FIG. 21 includes a TCR wire 835 having a track-parallel orientation. As can be seen in FIG. 21, the TCR wire 835 is connected to a first contact 837' and a second contact 837". Each of the first and second contacts 837' and 837" is connected to an opposing end of the TCR wire 835 and forms an approximate 90° angle therebetween. Whereas a conventional TCR wire 825 is substantially parallel with respect to its contacts 827, a TCR wire 835 in accordance with various embodiments is substantially orthogonal to its respective contacts 837' and 837".

FIGS. 20 and 21 further show the amount of padding needed to ensure that the TCR wires 825 and 835 are not interacting with asperities during active operation. The amount of padding needed for each TCR wire 825 and 835 is represented by the dotted lines extending down the page from the opposing ends of the respective TCR wires 825 and 835. A comparison of the area within the dotted lines shown in FIGS. 20 and 21 demonstrates that a track-parallel oriented TCR wire sensor 802 provides for a substantial reduction in the amount of padding required and concomitant increase in storage capacity in comparison to a conventional cross-track oriented TCR wire sensor 801.

In the case of the conventional TCR wire sensor 801 shown in FIG. 20, this standard sensor cross-track length is 500 nm and the down-track width is 35 nm. At zero skew, this means that the smallest cross-track asperity width that could be determined is ~500 nm (i.e., the effective sensor cross-track width is ~500 nm). Adding an additional ~500 nm for padding, the width of the conventional TCR wire sensor 801 suggests that each asperity would need to be padded by ~1 µm on each side.

Conversely, for the same dimension of the TCR wire sensor 801 under the same conditions, a track-parallel TCR wire sensor 802 according to embodiments of the disclosure (and as shown in FIG. 21) can characterize the asperity to ~35 nm and would only need an additional ~35 µm padding, resulting in padding of 0.07 µm on each side. At zero skew, a track-parallel TCR wire sensor 802 according to various embodiments results in 7% the padding of a conventional cross-track TCR wire sensor 801. This significant decrease in padding, and concomitant increase in drive capacity, is due to more accurately characterizing the true cross-track width of the asperities and the reduced amount of padding needed for the narrower sensor.

At high skew, the effective sensing width of the track-parallel TCR wire sensor 802 shown in FIG. 21 increases following Equation (13) below:

$$w_{eff} = w + l \sin \alpha \qquad \text{Equation 13}$$

Here, $w_{eff}$ is the effective cross-track width of the TCR wire sensor 802, w is the physical width of the TCR wire 835, l is the TCR wire length, and a is the skew. However, even up to skews of 20°, the effective sensor cross-track width, $w_{eff}$, of the track-parallel TCR wire sensor 802 is still much less than that of the conventional cross-track TCR wire sensor 801.

For the example above, the effective sensor width, $w_{eff}$, of the track-parallel TCR wire sensor 802 at 20° is 206 nm, which is 44% of that of the standard cross-track TCR wire sensor 801 with the same dimensions and head orientation. The specific padding savings will depend on the individual sensor design and operation skew.

The following are different non-limiting approaches to constructing a track-parallel TCR wire sensor 802 according to various embodiments:

1) Etch a trench (e.g., in SiO2 or Al2O3), and etch stop on the contact below. Then, use a Damascene plating process to fill the trench. Next, deposit or plate the top contact and cover with a dielectric and chemical mechanical polish (CMP).
2) Again, etch a trench as in 1 above. Then, use an atomic layer deposition (ALD) process to fill the trench (this will be slow without an ability to deposit on the sidewalls of the trench). Some chemistries may deposit directly on the dielectric. In these cases, a CMP step before depositing/plating the top contact will be required.
3) Create a large step rather than a trench. Then, utilize a directional deposition process such as ion beam deposition (IBD) and deposit off normal incidence and build up the wire on the sidewall of the step. Next, deposit the other side of the trench, dielectric, and CMP back to the metal on the top of the first step (this could be used as the stop for the CMP). Then, deposit the top contact and cover with dielectric and CMP.

FIG. 22 is an illustration of an apparatus 900 for detecting asperities, head-media contact, and head-media spacing changes in accordance with various embodiments. It is understood that numerous components of the apparatus 900 depicted illustrated in FIG. 22 are not shown for purposes of simplicity. The apparatus 900 shown in FIG. 22 depicts various components that can operate cooperatively to implement the various asperity, head-media contact, and head-media spacing change detection methodologies described herein. In this illustration, a control system 902 is shown coupled to a mass storage device comprising any number of hard disk drives 904.

FIG. 22 includes a reproduction of the slider 100 shown in FIG. 1, which supports a recording head transducer 103 equipped with a TCR sensor 105, spaced apart from a surface of a rotating magnetic storage medium 160. The control system 902 is shown to include a controller 914, a detector 912, and a power supply 910. The controller 914 is configured to operate cooperatively with various components of the apparatus 900 to control the rotation of the medium 160 and the movement of the slider 100, such as during read and write operations.

The power supply 910 provides power to various components of the apparatus 900. In the context of various embodiments, the power supply 910 is configured to provide bias power to the TCR sensor 105 and actuation power for the head transducer actuator. For example, the power supply 910 provides power to a heater 102 which operates as a thermal actuator for the head transducer 103. In the context of various embodiments described hereinabove, the power supply 910 is configured to supply bias power to each TCR sensor 105 of a multiplicity of head transducers 103 and to adjust the bias power to maintain each TCR sensor 105 at a fixed temperature above an ambient temperature in the presence of heat transfer changes impacting the TCR sensors 105.

The TCR sensor 105 is situated near or at a close point of the head transducer 105 and measures temperature at this location. The TCR sensor 105 is preferably a sensor having a temperature coefficient of resistance (TCR). The TCR sensor 105 may have a positive TCR or a negative TCR. As discussed previously, the measured temperature varies in response to changes in spacing between the head transducer 103 and the magnetic recording medium 160. The detector 912 is coupled to the TCR sensor 105 and is configured to detect a change in a component of the measured temperature indicative of one or more of an asperity, head-media contact, and a head-media spacing change.

According to various embodiments, the TCR sensor 105 is arranged at the head transducer 103 so that a longitudinal axis of the TCR sensor 105 is oriented substantially parallel relative to the tracks of the magnetic recording medium. The TCR sensor 104 is responsive to changes in spacing between the TCR sensor 105 and the medium 160 and, in particular, to asperities of the medium 160. In embodiments that employ a track-parallel TCR sensor 104, the detector 912 is configured for detecting asperities of the media 160 with a substantially reduced amount of track padding in comparison with conventional cross-track oriented TCR wire sensors.

According to some embodiments, power is supplied to the TCR sensor 105 by the power supply 910 to heat the head-to-disk interface to a temperature above a temperature of the medium 160. In other embodiments, the power supplied to both the TCR sensor 105 and the heater 102 by the power supply 910 to provide heating to the head-to-disk interface. The detector 912 is configured to detect changes in and AC or a DC component of a signal, depending on the type of head-to-disk interface (modulation HDI vs. non-modulation HDI), produced by the TCR sensor 105 indicative of an increased rate of heat transfer from the heated head-to-disk interface to the medium 160 in response to an asperity, head-media contact, or a head-media spacing change.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
   a plurality of head transducers configured to interact with magnetic recording media;
   a plurality of sensors having a temperature of coefficient of resistance, wherein at least one sensor is provided on each head transducer and is responsive to changes in spacing between the sensor and the media and configured to detect one or both of contact with asperities and head-media contact; and
   a power source configured to supply bias power to each sensor of each head transducer and to adjust the bias power to maintain each sensor at a fixed temperature above an ambient temperature in the presence of heat transfer changes impacting the sensors.

2. The apparatus of claim 1, wherein the at least one sensor is configured to detect contact with asperities and head-media contact.

3. The apparatus of claim 1, further comprising:
   a heater provided at each of the head transducers and configured to actuate the head transducers;
   wherein the power source is configured to adjust the bias power to maintain each sensor at the fixed temperature in the presence of heat transfer changes impacting the sensors including those due to power supplied to the heater.

4. The apparatus of claim 1, wherein maintaining each sensor at the fixed temperature eliminates transducer-to-transducer variance in detection signals produced by the plurality of sensors.

5. The apparatus of claim 1, wherein the at least one sensor is provided at a close point of each head transducer.

6. The apparatus of claim 1, further comprising a detector configured to detect one or both of an asperity of the recording media and head-to-media contact in response to detection signals produced by the plurality of sensors.

7. An apparatus, comprising:
   a plurality of head transducers configured to interact with magnetic recording media;
   a plurality of sensors having a temperature of coefficient of resistance, wherein at least one sensor is provided on each head transducer and is responsive to changes in spacing between the sensor and the media; and
   a power source configured to supply bias power to each sensor of each head transducer and to adjust the bias power to maintain a fixed overheat ratio (OHR) across all sensors in the presence of heat transfer changes impacting the sensors.

8. The apparatus of claim 7, wherein the fixed OHR is fixed at different values for different radii of the media.

9. The apparatus of claim 7, wherein the fixed OHR is fixed at different values as a function of time for sensors having a response that decays with time.

10. The apparatus of claim 7, further comprising:
    a heater provided at each of the head transducers and configured to actuate the head transducers;
    wherein the power source is configured to adjust the bias power to maintain each sensor at the fixed OHR in the presence of heat transfer changes impacting the sensors including those due to power supplied to the heater.

11. The apparatus of claim 7, wherein maintaining each sensor at the fixed OHR eliminates transducer-to-transducer variance in detection signals produced by the plurality of sensors.

12. The apparatus of claim 7, wherein the at least one sensor is provided at a close point of each head transducer.

13. The apparatus of claim 12, further comprising a detector configured to detect one or both of an asperity of the recording media and head-to-media contact in response to detection signals produced by the plurality of sensors.

14. A method, comprising:
    with magnetic recording media moving relative to a plurality of head transducers:
    sensing for changes in spacing between the head transducers and the media using sensors having a temperature of coefficient of resistance, the sensors configured to detect one or both of contact with asperities and head-media contact;

supplying bias power to the sensors; and adjusting the bias power to maintain each sensor at a fixed temperature above an ambient temperature in the presence of heat transfer changes impacting the sensors.

15. The method of claim 14, further comprising:

thermally actuating the head transducers to cause the head transducers to move toward the media; and adjusting the bias power to maintain each sensor at the fixed temperature in the presence of heat transfer changes impacting the sensors including those due to thermally actuating the head transducers.

16. The method of claim 14, further comprising detecting one or both of an asperity of the recording media and head-to-media contact in response to detection signals produced by the plurality of sensors.

17. A method, comprising:

with magnetic recording media moving relative to a plurality of head transducers:

sensing for changes in spacing between the head transducers and the media using sensors having a temperature of coefficient of resistance;

supplying bias power to the sensors; and adjusting the bias power to maintain each sensor at a fixed overheat ratio (OHR) in the presence of heat transfer changes impacting the sensors.

18. The method of claim 17, further comprising:

thermally actuating the head transducers to cause the head transducers to move toward the media; and adjusting the bias power to maintain each sensor at the fixed OHR in the presence of heat transfer changes impacting the sensors including those due to thermally actuating the head transducers.

19. The method of claim 17, further comprising:

measuring a cold or ambient resistance, $R_0$, of each sensor;

increasing the bias power supplied to each sensor while measuring changes in hot resistance, $R_W$, of each sensor;

calculating OHR using the measured cold and hot sensor resistances, $R_0$ and $R_W$; and adjusting the bias power to maintain each sensor at the calculated OHR.

20. The method of claim 17, further comprising detecting one or both of an asperity of the recording media and head-to-media contact in response to detection signals produced by the plurality of sensors.

21. An apparatus, comprising:

a head transducer configured to interact with a magnetic recording medium having a plurality of tracks; and a sensor having a temperature coefficient of resistance and arranged at the head transducer so that a longitudinal axis of the sensor is oriented substantially parallel relative to the tracks, the sensor responsive to changes in spacing between the sensor and the medium and configured to detect one or both of contact with asperities and head-media contact.

* * * * *